(12) United States Patent
Pance et al.

(10) Patent No.: US 8,797,999 B2
(45) Date of Patent: Aug. 5, 2014

(54) DYNAMICALLY ADJUSTABLE COMMUNICATIONS SERVICES AND COMMUNICATIONS LINKS

(75) Inventors: Aleksandar Pance, Saratoga, CA (US); Todd Benjamin, Saratoga, CA (US); Brett Bilbrey, Sunnyvale, CA (US); Anand Sethuraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 12/721,528

(22) Filed: Mar. 10, 2010

(65) Prior Publication Data

US 2011/0222466 A1    Sep. 15, 2011

(51) Int. Cl.
*H04W 4/00* (2009.01)

(52) U.S. Cl.
USPC ............................................. 370/331

(58) Field of Classification Search
USPC .................................. 370/331; 455/436, 442
See application file for complete search history.

(56) References Cited

U.S. PATENT DOCUMENTS

| | | | |
|---|---|---|---|
| 6,351,653 | B1 | 2/2002 | Alberth, Jr. et al. |
| 7,069,014 | B1 | 6/2006 | Thenthiruperai et al. |
| 7,117,001 | B2 | 10/2006 | Lin et al. |
| 7,319,740 | B2 | 1/2008 | Engelke et al. |
| 7,424,289 | B2 * | 9/2008 | Levien et al. ................. 455/417 |
| 7,591,020 | B2 * | 9/2009 | Kammer et al. ................ 726/26 |
| 7,616,961 | B2 | 11/2009 | Billhartz |
| 7,848,494 | B2 * | 12/2010 | Beith et al. ................. 379/88.14 |
| 2001/0036174 | A1 | 11/2001 | Herring |
| 2003/0054810 | A1 * | 3/2003 | Chen et al. .................... 455/422 |
| 2005/0031092 | A1 * | 2/2005 | Umemura et al. ......... 379/88.13 |
| 2005/0273327 | A1 | 12/2005 | Krishnan |
| 2006/0221939 | A1 | 10/2006 | Rosen et al. |
| 2006/0293888 | A1 * | 12/2006 | Jindal .......................... 704/235 |
| 2007/0138302 | A1 * | 6/2007 | Antoniou ..................... 235/492 |
| 2007/0218902 | A1 * | 9/2007 | Smyk et al. .................. 455/436 |
| 2010/0049808 | A1 * | 2/2010 | Rosenberg .................. 709/206 |
| 2010/0311401 | A1 * | 12/2010 | Oh et al. ...................... 455/417 |
| 2011/0003585 | A1 * | 1/2011 | Wang et al. .................. 455/418 |

* cited by examiner

*Primary Examiner* — Dang Ton
*Assistant Examiner* — Kevin Lee
(74) *Attorney, Agent, or Firm* — Womble Carlyle Sandridge & Rice LLP

(57) ABSTRACT

User equipment may be used in forming communications links between users. A virtual communications channel may be maintained between users while adjustments are made to the type of communications traffic that is being conveyed over the link, the nature of the physical channels being used in the link, link bandwidth and other link attributes, user requirements, and other factors. Monitoring circuitry may be used to monitor factors such as the location of a device and other operating parameters. As circumstances dictate, the operation of the device may be adjusted in real time, while maintaining the virtual communications channel intact. User devices may automatically advertize their presence and may automatically detect nearby devices. Content items may be shared using online services.

17 Claims, 16 Drawing Sheets

0
DYNAMICALLY ADJUSTABLE COMMUNICATIONS SERVICES AND COMMUNICATIONS LINKS

BACKGROUND

This relates generally to communications services, and more particularly, to adjusting which services and communications are used in response to changes in the operating environment of an electronic device.

Electronic devices such as cellular telephones and portable computers are often used in a variety of environments. For example, a user may sometimes use a cellular telephone in a location that is within range of a high quality local wireless link. At other times, the user may use the cellular telephone in a location where the local wireless link is not available. In some situations, a user may be in the vicinity of additional equipment, whereas this equipment may not be present in other situations. As a user interacts with an electronic device, the user launches a variety of applications. For example, a user may use a video playback function. Communications services and other network-based services may be used.

In a complex operating environment such as this, it can be difficult to manage a user's services and communications. For example, a user may find it difficult or impossible to continually choose appropriate communications channels in response to increases and decreases in the availability of certain communications capabilities and in response to varying operating requirements. A user may also find it challenging to form communications links with available nearby or remote equipment. For example, it may be difficult to use hardware in the vicinity of a user and it may be difficult to share content with different devices. The desire to optimize a user's communications scheme and to adjust which types of services are being provided to a user can be further complicated by the wide variety of factors that can influence these decisions. For example, the communications scheme and type of services that are running on a user's device may be influenced by available communications capabilities, security requirements, location, service-based communications link requirements, and other factors.

It would therefore be desirable to provide improved ways in which to customize communications links and services in response to monitored changes in the operating environment of an electronic device.

SUMMARY

To accommodate fluctuations in the operating environment of user equipment that is involved in supporting a communications link between users, the user equipment may monitor factors such as the location of a user device, the type of traffic that is being transmitted over a communications link, the quality of available physical channels, user requirements, the availability of equipment, the desire support communications with particular types of shared content and traffic, and other device operating parameters.

A telephone call or other link may be made between users over a communications network. Each user may have an electronic device such as a cellular telephone or other portable electronic device. When users are connected over the network, a virtual communications channel is formed. The nature of the communications over the channel may vary over time.

For example, the quality of the communications link that supports the telephone call can become degraded as a user moves the portable electronic device. Movement of a device may also expose the device to external equipment with which wireless links may be formed.

The electronic device of the user can accommodate link quality changes without interrupting the virtual communications link that is formed between users. For example, if a link degrades, the electronic device can automatically adjust the type of traffic that is being sent over the link from a first type (e.g., video or voice over internet protocol audio traffic) to a second type (e.g., text messages or cellular telephone audio). To ensure continuity when transitioning between traffic types, a buffer may be maintained. The buffer may, for example, be used to store audio from a telephone call. When link quality degrades, the audio information in the buffer may be converted into text information using a voice-to-text conversion operation implemented on the electronic device or other equipment in the communications network. The text that is produced in this way may be used to populate text messaging text boxes on the user's display.

To ensure that the device can seamlessly add and drop services, devices may automatically advertize their presence using radio-frequency identification (RFID) transceiver circuitry. Devices may be registered with an online service that maintains a list of current network addresses. As circumstances dictate, the electronic device can adjust communications link parameters such as bandwidth, latency, traffic type, physical channels, and other communications link attributes while maintaining virtual connections between users and while supporting service discovery and content sharing.

Further features of the invention, its nature and various advantages will be more apparent from the accompanying drawings and the following detailed description of the preferred embodiments.

DETAILED DESCRIPTION

Figure 1:
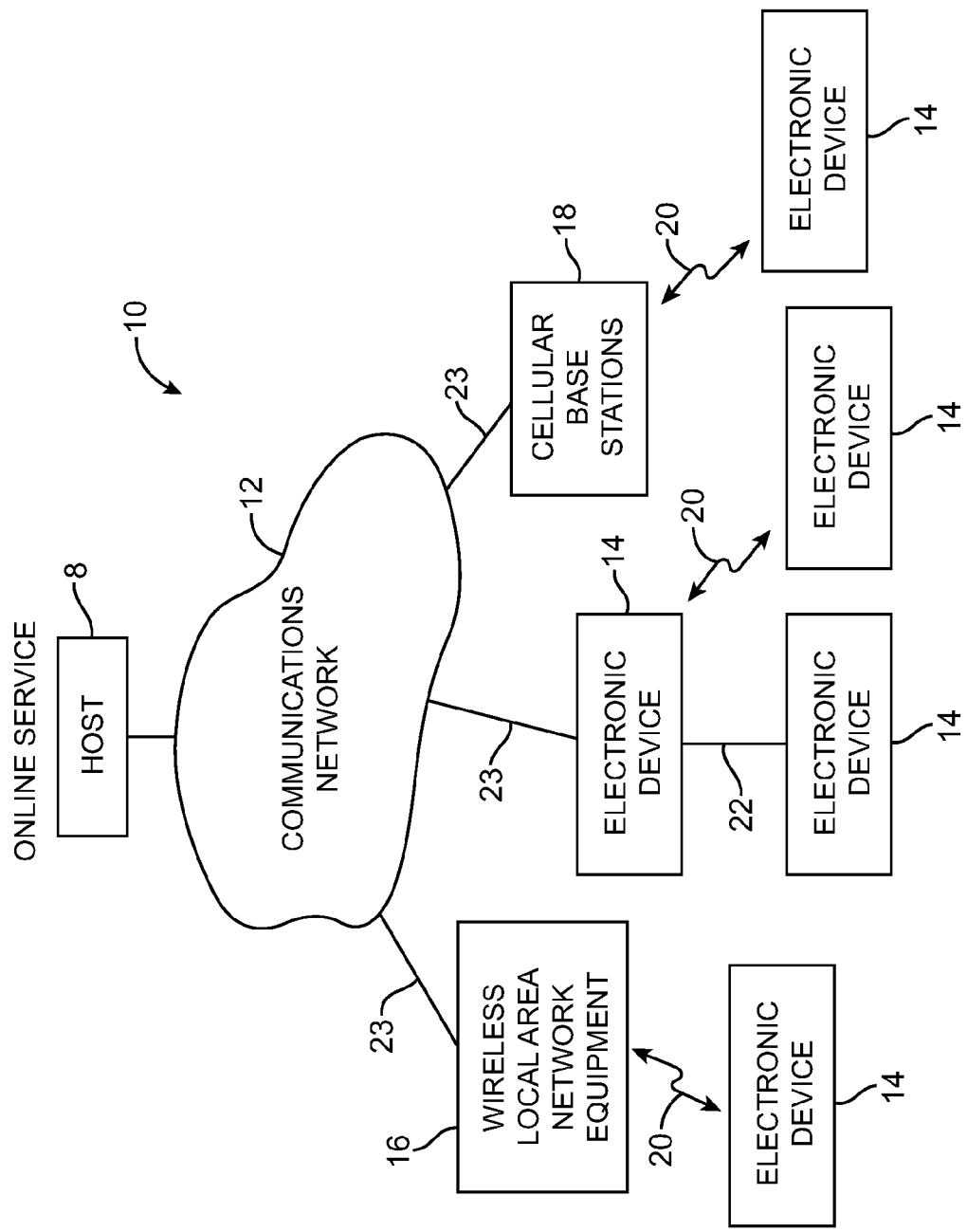
FIG. 1 is a perspective view of an illustrative system in which an electronic device with wireless communications circuitry may be used in accordance with an embodiment of the present invention.

Electronic devices may be provided with wireless communications circuitry. The wireless communications circuitry may be used to support wireless communications such as long-range wireless communications (e.g., communications in cellular telephone bands) and short-range communications (i.e., local area network links such as WiFi® links, Bluetooth® links, etc.). The wireless communications circuitry may include radio-frequency identification (RFID) transceiver circuitry for communicating with RFID-enabled devices.

During operation of an electronic device, the electronic device may be subject to changes in its operating environment. For example, a user may change the location of the electronic device. Other changes that may affect the operating environment of the electronic device include changes in which applications are running on the device and which application features are being used.

A variety of external devices such as ancillary user equipment may come in and out of range of the device. For example, as a user enters an office that contains a computer monitor, the user may bring the electronic device into wireless communications range of the computer monitor. As the user enters a home, the user may bring the electronic device into wireless communications range of a television. Local area networks and cellular networks may also come in and out of range because of device movement and other factors.

As a user runs different applications and uses different services, the user may need to be provided with different communications bandwidths or other communications link attributes may need to be adjusted. For example, if a user launches a game application, a low latency connection may be required. If a user is running a voice over internet protocol (VoIP) application, a communications path that supports internet protocol packets may be required. If operation of a service involves the transmission of video information, a larger bandwidth may be needed than if only audio information is transmitted.

To accommodate variations in the operating environment of an electronic device, the electronic device may have operating environment monitoring capabilities. Depending on monitored conditions, the operation of the device may be adjusted. For example, the types of applications that are running on a device and the types of features that are implemented on the device may be adjusted based on monitoring results. As another example, the types of wireless links that are formed may be adjusted. These adjustments and other suitable adjustments may be made automatically by the electronic device or may be made based on manual user input.

The monitoring features of an electronic device may be implemented using software, hardware, or a combination of hardware and software. For example, software on a device may be used to monitor whether an application is running that requires video. As another example, the geographic location of a device may be monitored at least partly using Global Positioning System (GPS) hardware such as a GPS receiver. Wireless circuitry may be used in monitoring wireless signals. The wireless circuitry may, for example, make radio-frequency signal strength measurements or other measurements that indicate the quality of existing or potential wireless communications links. In some situations, a device may communicate with external equipment such as devices in the vicinity of a user's device or devices that are accessible only over a wide area network such as the internet. After exchanging information with external equipment to ensure that additional communications with the external equipment are appropriate, an electronic device may interact with the electronic equipment using a communications link such as a wireless communications link.

An illustrative system in which customization operations such as these may be performed is shown in FIG. 1. As shown in FIG. 1, system 10 may include a communications network such as network 12. Communications network 12 may include wired and wireless local area networks and wide area networks (e.g., the internet). Equipment such as host 8 may be used in implementing online services. Hosts such as host 8 may include one or more networked computers (e.g., servers) on which software is run to implement software-based services. The services that are hosted using computing equipment such as host 8 may include video server services, audio server services, web page services, communications services, media playback services, online storage services, social networking services, games, etc. The servers that are used in implanting online services may be implemented using one or more computers that are located at one or more different geographic locations.

Electronic devices 14 may be interconnected using communications paths in system 10. In a typical wired connection arrangement, an electronic device may be connected to network 12 using a cable. The cable may connect the electronic device to equipment in network 12. For example, link such as link 23 of FIG. 1 may be used to interconnect an electronic device to network 12 (e.g., using a modem). Wireless links may also be formed as part of links 23 or other links in system 10.

For example, an electronic device may have a wireless local area network adapter that allows the device to communicate wirelessly with wireless local area network equipment such as wireless local area network equipment 16. Wireless local area network equipment 16 may be, for example, a router or access point that supports IEEE 802.11 communications (sometimes referred to as WiFi®). As illustrated in FIG. 1, one or more electronic devices 14 may be connected to the network by forming a local wireless link such as one of links 20 with equipment 16.

In addition to forming local wireless links, electronic devices 14 may form remote wireless links (i.e., links that may cover distances of a mile or more). Links of this type may be made, for example, with cellular telephone base stations such as cellular telephone base stations 18. In the example of FIG. 1, one of cellular base stations 18 is shown as forming a remote wireless link 20 with an associated one of electronic devices 14.

Wireless local area network equipment 16 and cellular base stations 18 may be connected to other equipment in network 12 using wired or wireless links (shown as links 23 in FIG. 1). Because wireless local area network equipment 16 and cellular base stations 18 serve to provide access to network 12, equipment 16 and cellular base stations 18 may serve as part of communications network 12 and are sometimes referred to as forming wireless network equipment. Other wireless equipment may also be used in network 12 and in forming wireless connections to network 12. The example of FIG. 1 is merely illustrative.

By interacting with local area network equipment 16 and cellular base station equipment 18, electronic devices 14 may form communications links with each other. For example, electronic devices 14 that are connected to the same wireless local area network 16 may communicate with each other over the network. In this type of situation, each electronic device forms a respective wireless link with the local area network. Devices 14 may also communicate with each other using cellular base stations 18. For example, two users may communicate with each other by forming a cellular telephone voice link such as a Global System for Mobile (GSM) communications link or a code division multiple access (CDMA) link.

Communications schemes that use a mixture of local and remote links may also be used. For example, a first user with an electronic device that is connected to a local area network may form a local wireless link with that network. A second user may form a network connection using a cellular telephone communications link. Using the capabilities of the devices or equipment in network 12, the devices associated with the first and second users may communicate. As an example, the first user may send and receive voice over internet protocol traffic. A host such as host 8 or other network equipment may be used to convert the voice over internet protocol traffic to cellular telephone call data and vice versa. In this respect, the host may serve as an intermediary that translates between the voice over internet protocol data that is transmitted and received by the first user and the cellular telephone traffic that is transmitted and received by the second user.

Electronic devices 14 may, if desired, communicate in a peer-to-peer fashion. For example, devices 14 may include wireless local area network circuitry, Bluetooth® circuitry, or radio-frequency identification (RFID) circuitry that allows these devices to directly communicate with peer devices 14. A cellular telephone may, for example, communicate directly with a computer monitor or, as other examples, a tablet computer may communicate directly with a computer monitor, a television, or a dock. As shown in the diagram of FIG. 1, electronic devices 14 may form direct peer links using wired links such as wired link 22 and wireless links such as wireless links 20. An advantage of forming peer links wirelessly is that this allows devices to readily advertize their capabilities.

Figure 2:
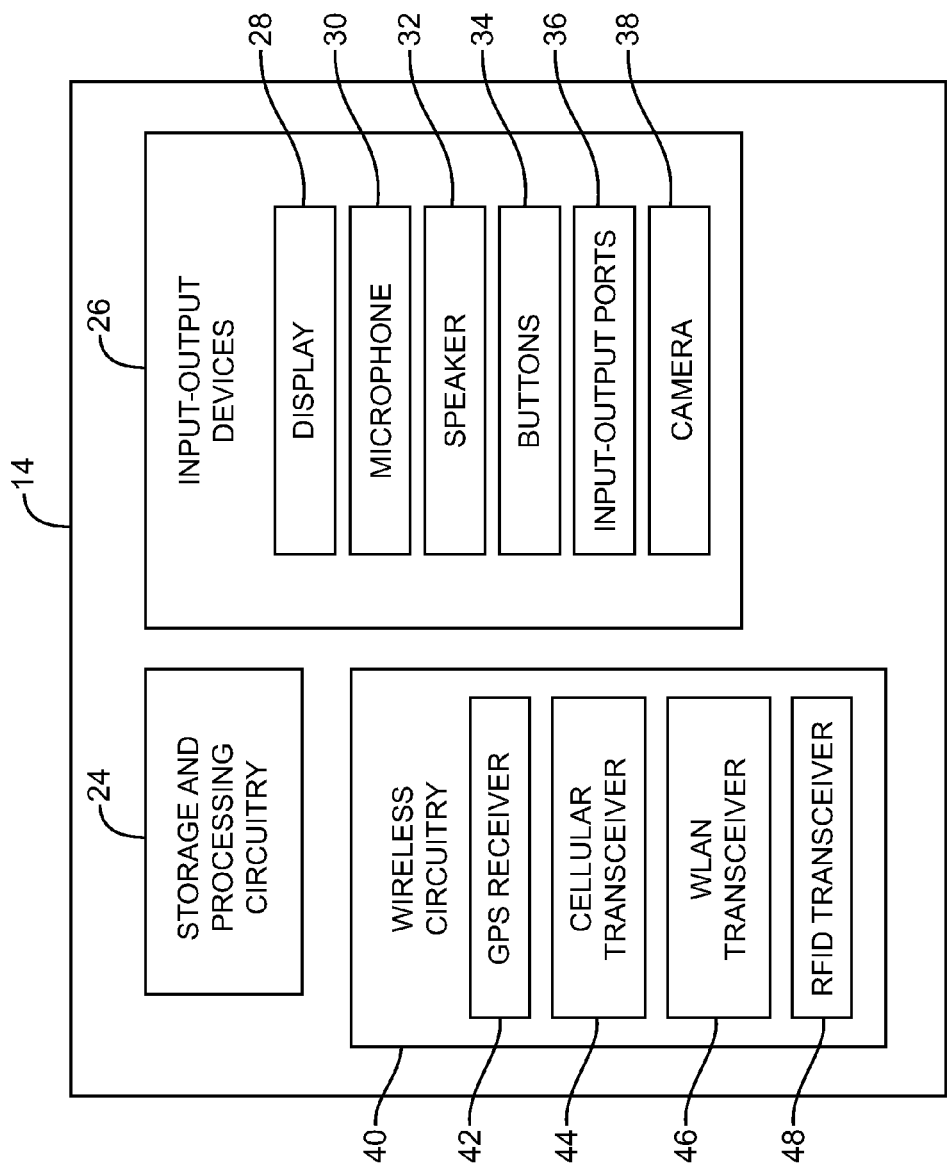
FIG. 2 is a schematic diagram of an illustrative electronic device with wireless communications circuitry in accordance with an embodiment of the present invention.

An illustrative electronic device that may be used in a system such as system 10 of FIG. 1 is shown in FIG. 2. Electronic device 14 of FIG. 2 may be a desktop computer, consumer electronics equipment such as an audio-video receiver or television, or other suitable equipment. In some situations, electronic devices 14 may be portable devices such as handheld devices. Examples of portable electronic devices include laptop computers, tablet computers, handheld computing equipment such as cellular telephones, media players, Global Positioning System (GPS) devices, gaming platforms, cameras, media players, remote controls, small wearable devices such as wrist-mounted devices and pendant devices, etc.

As shown in FIG. 2, electronic device 14 may include storage and processing circuitry 24. Storage and processing circuitry 24 may include storage such as hard disk drives, solid state drives, and other nonvolatile memory. Storage in circuitry 24 may also include volatile memory devices such as dynamic and static random-access memory chips. Storage may be implemented using stand-alone integrated circuits and may be embedded within other integrated circuits. For example, microprocessors may include cache memory and application-specific integrated circuits may include registers. Processing circuitry in circuitry 24 may be based on one or more microprocessors, microcontrollers, digital signal processing circuits, application-specific integrated circuits, or other processors. Software code may be stored in storage and processing circuitry 24. When run on storage and processing circuitry 24, the code may direct device 14 to implement desired functions.

Wireless circuitry 14 may be used to form local and remote wireless links such as links 20 of FIG. 1. Local wireless links may be formed using wireless local area network transceiver 36 (e.g., IEEE 802.11 and Bluetooth®). Remote wireless links may be formed using cellular telephone transceiver 44. RFID transceiver 48 may be used in forming local wireless links with compatible RFID transceiver circuitry in other electronic devices.

Global Positioning System receiver 42 may be used to receive satellite positioning system data (e.g., GPS data). Device 14 may use this data to determine the geographic location of device 14.

Input-output devices 26 may be used to supply data from within device 14 to external equipment. Input-output devices 26 may also be used to receive information from external equipment. Examples of input-output devices that may be included in equipment 14 include displays, cameras, microphones, speakers, buttons, keyboards, trackpads, touch screens, sensors, input-output ports, etc.

As shown in the FIG. 2 example, input-output devices 26 may include a display such as display 28. Display 28 may be include image pixels formed using liquid crystal display (LCD) technology, electronic ink, organic light-emitting diodes, plasma cells, etc. If desired a touch sensitive sensor array such as an array of capacitive sensors may be incorporated into display 28 (i.e., to implement a touch screen). Display 28 may be used to display output for a user and may be used in receiving corresponding user input (e.g., when display 28 is a touch screen).

Device 14 may include one or more microphones such as microphone 30. Microphone 30 may be integrated into the housing of device 14 or may be connected to device 14 using a cable. During operation of device 14, microphone 30 may be used to gather the user's voice and other audio signals. Voice recognition operations, cellular telephone calls, voice memo features, and other device functions may be implemented using microphone 30. As an example, device 14 may use microphone 30 to gather a user's voice as part of a voice authentication process. With this type of arrangement, a user may be authenticated by analyzing a sample of the user's voice using storage and processing circuitry 24.

Speakers such as speaker 32 may be used to present audio information to a user. For example, speaker 32 may be used in playing content such as songs and other audio tracks and video tracks that include audio. Speaker 32 may also be used to present a user with audio from a voice telephone call or from a video conferencing call.

Buttons 34 may include menu buttons, option selection buttons (e.g., buttons aligned with on-screen options), volume control buttons, media playback control buttons, power buttons, keys, keypads, keyboards, etc. Buttons 34 and other user input devices may be used to gather commands and other user input from a user. For example, buttons 34 may be used to gather text for a text message, etc.

Input-output ports 36 may be used to connect device 14 to external equipment. Ports 36 may include audio jacks, optical ports, 30-pin data connector ports, universal serial bus ports, video display ports, or other suitable input-output ports.

Camera 38 may be used to gather still and moving images. For example, camera 38 may be used to gather video for a video conference. Still and video images may be processed to perform user authentication operations. For example, a still image of a user's face may be processed to implement a facial recognition feature for device 14. There may be one, two, or more than two cameras 38 in device 14.

The ability of devices 14 to monitor operating environment parameters while in use allows devices 14 to operate seamlessly despite changing circumstances. For example, if device 14 is moved from a location in which only cellular telephone service is available to a location in which internet access is available through a wireless local area network connection, device 14 can automatically transition from the cellular network to the wireless local area network. During this transition, the user may be kept in uninterrupted contact with another user (e.g., the other party in a two-person telephone call). Similarly, if a user is conducting a video call with another user, communications between the two users may be maintained, even when the quality of the communications link between the two users becomes degraded.

When a pair of devices 14 in system 10 is able to maintain continuous communication between a pair of respective users under a variety of changing conditions including changes in the physical communications channel that is used, these devices are sometimes referred to as maintaining a continuous virtual communications channel (link) between the users. Physical links may be formed and broken repeatedly (e.g., as the user and the user's device move in and out of range of a wireless local area network that is being used to support VoIP calling), but the virtual channel can be maintained.

To ensure robust communications under a variety of conditions, system 10 and devices 14 may maintain a virtual communications link even under conditions that require changes to the type of communications services being used. For example, consider a situation in which a user is conducting a video call with another user. To support the relatively high bandwidth that is desired to support high-quality video traffic, the user's device may be connected to network 12 using a wireless local area network connection. If this connection is degraded (e.g., because the user moves the user's device away from the wireless local area network), it may no longer be possible to support a desired level of video quality for the video call. Rather than drop the call completely, however, the user's device and the device of the user on the other end of the call can negotiate an agreement to drop to a reduced level of service. The devices may, for example, decide to drop to a communications mode in which only periodic still images are transmitted (e.g., images transmitted every few seconds with continuous accompanying audio or may replace video traffic with audio-only traffic).

As another example, consider a scenario in which a user is conversing with another user over a cellular telephone call. Because of movement of the user or other causes, the quality of the cellular telephone link between the user's device and its associated cellular base station may become degraded. Rather than dropping the cellular call entirely, the electronic devices may be used to convey text messages. By automatically transitioning between the cellular telephone call and an associated text messaging session when the communications link between the two users becomes degraded, the virtual communications link between the two users may be maintained.

As these examples demonstrate, virtual links may be maintained, even as physical communications channels change and even as the level and type of communications service that is being used changes. In the foregoing examples, specific types of link changes and corresponding service changes were involved. This is, however, merely illustrative. In general, any types of changes to the operating environment of the user devices may be involved and any corresponding action may be taken in response while maintaining a virtual communications link between users.

Figure 3:
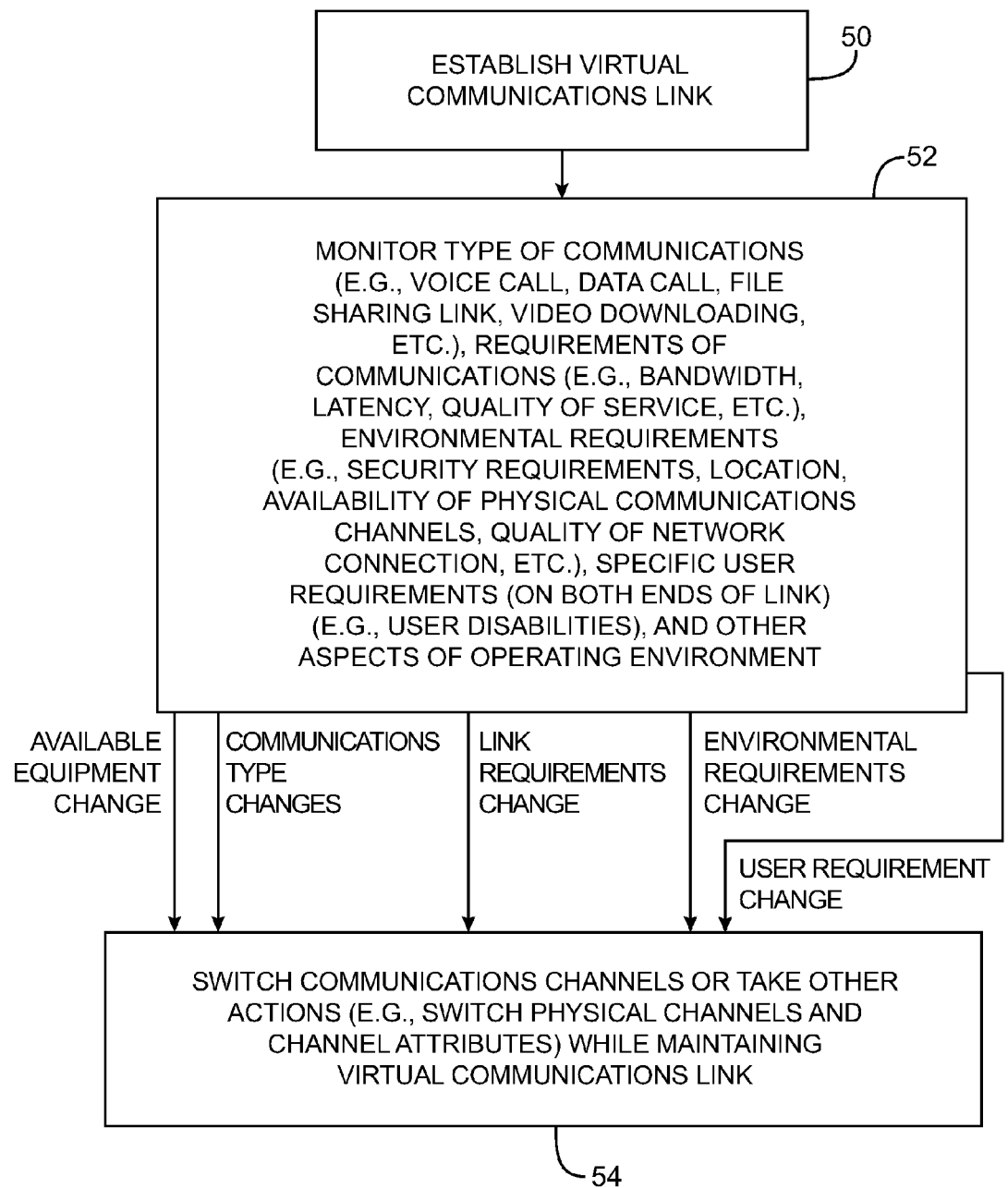
FIG. 3 is flow chart of illustrative steps involved in operating an electronic device subject to varying operating conditions in accordance with an embodiment of the present invention.

FIG. 3 shows illustrative steps involved in using devices such as device 14 of FIG. 2 to communicate in a system such as system 10 of FIG. 1 while maintaining a virtual link between a pair of devices.

At step 50, a user at one device may establish a connection with another device, thereby forming a virtual communications link between the two devices. The user may, for example, place a telephone call to a called party, may send a text message to a message recipient, may establish a video link with another user, may establish a VoIP call with another user, or may form any other communications link between two users (or more than two users in conference call scenarios). The communications link that is formed serves to establish a virtual communications link between the two users.

To ensure that the virtual communications link may be maintained even in the event that changes are required to the communications link that is initially formed. Operating environment monitoring operations may be performed at step 52. The operations of step 52 may be performed using storage and processing circuitry 24 and other device and network resources.

Storage and processing circuitry 28 may monitor the status of software that is running on device 14 to determine what types of communications are desired (e.g., video calls, audio calls, data links, file sharing links, video downloading, etc.). If an audio call is initially desired, but subsequent events lead to a desire to support a video stream at a higher data rate, this increased demand for link bandwidth can be automatically detected by device 14.

Examples of communications links requirements that may be monitored by device 14 during step 52 include required levels of bandwidth (e.g., to support video streaming), required latency values (e.g., to support gaming), required quality of service levels (e.g., to support voice calls), etc.

Environmental requirements may also be monitored. For example, device 14 may determine a level of required security for device 14 or an application (service) running on device 14. Device 14 may also determine the location of device 14 and, using the location of device 14, may determine what service features are to be adjusted accordingly. Factors such as these may be used in controlling the services that are provided by device 14. For example, device 14 may use satellite position data, location data derived from a cellular telephone network, location data obtained from a wireless local area network, or manually entered location information to determine whether device 14 is in a private or public location. Device 14 may, for example, use map data or data on the location of the user's office and residence to determine whether or not device 14 is being operated in public or in private. Based on this information, device 14 can switch between different modes of communication or may take other suitable actions. As an example, if a user has formed a communications link such as a voice telephone call link with another party while the user is in a private location, device 14 may automatically transition from voice to text messaging when the user moves device 14 to a public location. If desired, device 14 can prompt the user before making the transition. Security settings may be adjusted in device 14 so that a user may opt to inhibit this type of behavior. If the security settings are adjusted to choose a high level of security, voice calls and other communications sessions with potentially sensitive communications content can be automatically switched to less exposed forms of communication whenever device 14 enters a location that is public or that otherwise raises a desired for an elevated level of security (e.g., particular office locations, etc.).

Other environmental requirements that may be monitored by device 14 include the availability of physical communications channels (e.g., wireless signal strength for various bands, communications protocols, and wireless channels) and the quality of network connections (e.g., whether the signal strength for an existing channel has degraded to an undesirable level).

Different users may have different requirements (e.g., to accommodate disabilities, etc.). Accordingly, device 14 may monitor user requirements to determine how to control devices 14 while maintaining the virtual communications link. If, for example, a particular user has poor eyesight, device 14 can switch to a voice synthesized text messaging scheme rather than switching from use of voice communications to a scheme where text messages are displayed on a display unit.

Due to movements in the physical location of device 14 relative to other equipment or other factors, new equipment may sometimes become available for communication with device 14. For example, if device 14 is moved within range of an electronic device such as a dock, computer monitor, or other such device, device 14 and the other device may communicate (e.g., using RFID or other wireless scheme). For example, the other device may advertize its presence to device 14 wirelessly. When device 14 detects that new equipment is available within range of device 14, device 14 and the other device may negotiate to determine how the capabilities of the new device may be used by device 14. The use of new equipment may sometimes be referred to as a service change, because newly supported features become available when the new equipment is added to the operating environment of device 14.

If desired, device 14 may automatically update a display or other user interface component continuously or whenever new devices are discovered. Information may be presented on nearby devices (e.g., input-output devices such as computer displays, televisions, etc.). For example, a list of available devices and services may be presented in a bar-shaped peripheral region of a user's display. This region may be filled with icons corresponding to available devices. Devices for which resources are already being used may be highlighted. A user may click on an icon of a device to initiate a service change or to inquire about the status of parameters associated with the service. For example, a user may click on an icon to obtain information on network bandwidth, telephone number for nearby land lines, to obtain details concerning the current user of a nearby computer, to obtain resolution information for a nearby display or projector, etc. If sufficiently accurate position data is available for nearby devices (e.g., because this data has been gathered using GPS, RFID, 60 GHz imaging, or other suitable positioning techniques), icons for services can be automatically located on the screen of device 14 according to the relative physical position of the service. As an example, a service that is available to the left of the user and to the left of the user's device may be presented on the left side of the display of the device.

When monitoring the operating environment of device 14 during the operations of step 52, storage and processing circuitry 24 may detect changes to the operating environment of device 14 that warrant corresponding changes in communications link attributes or that warrant taking other actions at step 54. The changes that are detected at step 52 may include communications type changes, link requirement changes, environmental requirement changes, changes to user-specific requirements, and changes to available equipment in the vicinity of device 14.

The actions that are taken at step 54 in response to the detected changes of step 52 include switching physical communications channels (e.g., switching from a wireless local area network link to a cellular telephone link) and making changes to communications channel attributes (e.g., changing a data rate, changing a wireless local area network link from operating on channel 6 to operating on channel 11, changing which error correction scheme is being used or deactivating error correction, changing data encryption settings, changing the bandwidth of the communications link, making link adjustments that affect latency, changing which communications protocol is used, changing which wireless communications band is being used, etc.).

During step 54, changes may also be made to the mode of communications or the type of features involved in supporting a communications service. For example, video may be replaced with still images or audio may be replaced with text. Adjustments to the type of data traffic that is being conveyed over the communications link between user devices may be made to ensure that channel constraints are not exceeded (e.g., to ensure that the required bandwidth and latency for the link are acceptable, to ensure that the service functions properly for the user, etc.). Changes such as these are sometimes referred to as service customization changes. Changes in communications channel attributes may also sometimes impact the level or type of service that is received by a user. In some situations, a detected change may relate to the use of newly available equipment. For example, if a device is newly detected that is able to display video, the changes that are made at step 54 may involve the use of the new device to display video that is associated with the use of device 14.

Figure 4:
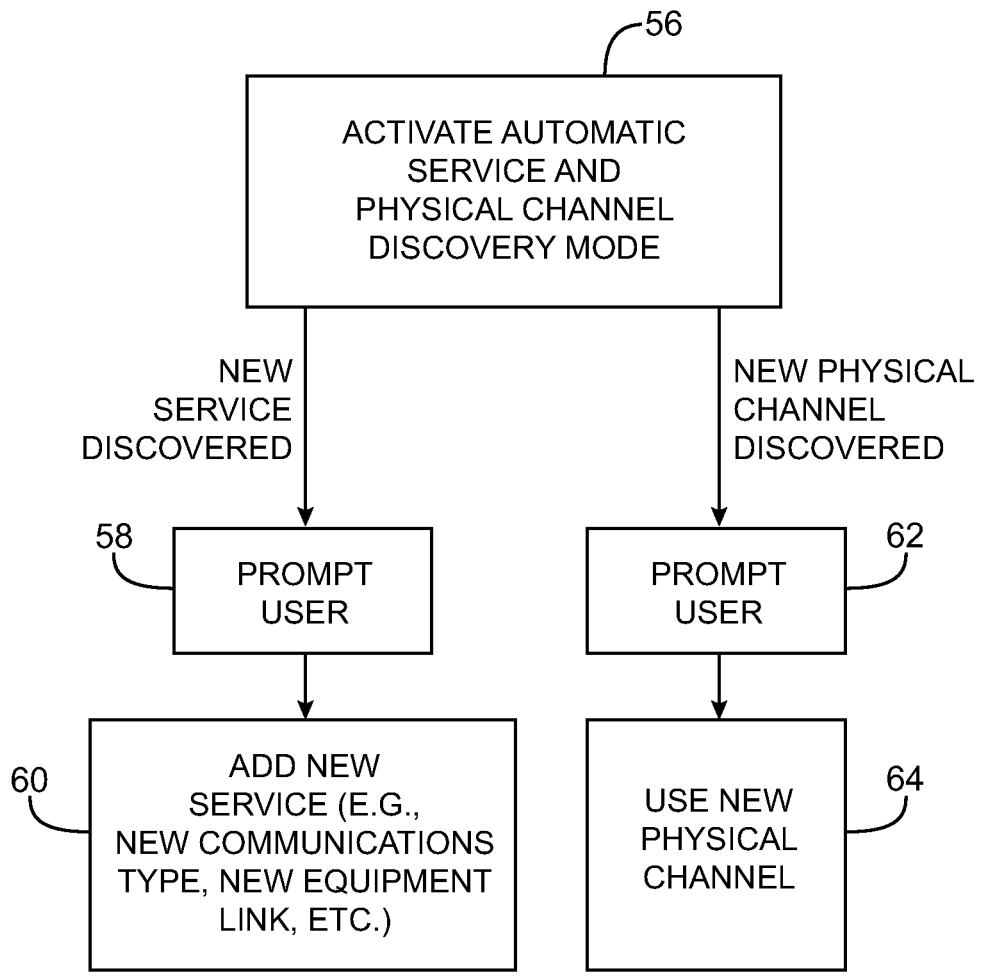
FIG. 4 is a flow chart of illustrative steps involved in adjusting services and communications channel attributes in response to changes in the operating environment of an electronic device in accordance with an embodiment of the present invention.

If desired, device 14 and the other equipment of system 10 may support automatic service discovery and automatic physical channel discovery features. This is illustrated in the flow chart of FIG. 4.

At step 56, an automatic service discovery mode for device 14 may be activated. During step 56, an automatic physical channel discovery mode may also be activated. Activation may be initiated in response to user input or other criteria or may be used in device 14 as a default. For example, a user may be presented with an on-screen option in device 14 that allows the user to toggle between automatic service and wireless physical channel discovery modes and inactive modes in which service discovery and wireless physical channel discovery features are not present.

Once service and physical channel discovery has been activated, device 14 may be used in a system. If a new service is discovered, the user may be provided with an optional prompt at step 58. The prompt may inform the user that a new service is available and may ask the user to choose whether or not to use the new service. If the user directs the device to use the new service, the new service may be added at step 60. For example, if new equipment is discovered, the user may, at step 58, be provided with a prompt such as "add new monitor named DISPLAYABC?". If the user responds affirmatively, the user's device may use the capabilities of the new monitor.

If a new physical channel is discovered during the operations of step 56, the user may be provided with an optional prompt at step 62. For example, if a new local area network is discovered, the user may be provided with a prompt at step 62 such as "join wireless network SSID123?". If the user response affirmatively, the user's device may establish a wireless communications link with the wireless network named SSID123. Existing connections may be dropped or maintained.

Prompts such as prompts 58 and 62 may be omitted. For example, a user may make a global settings adjustment in device 14 that instructs device 14 to omit future prompts or this behavior may be programmed into device 14 as a default.

Figure 5:
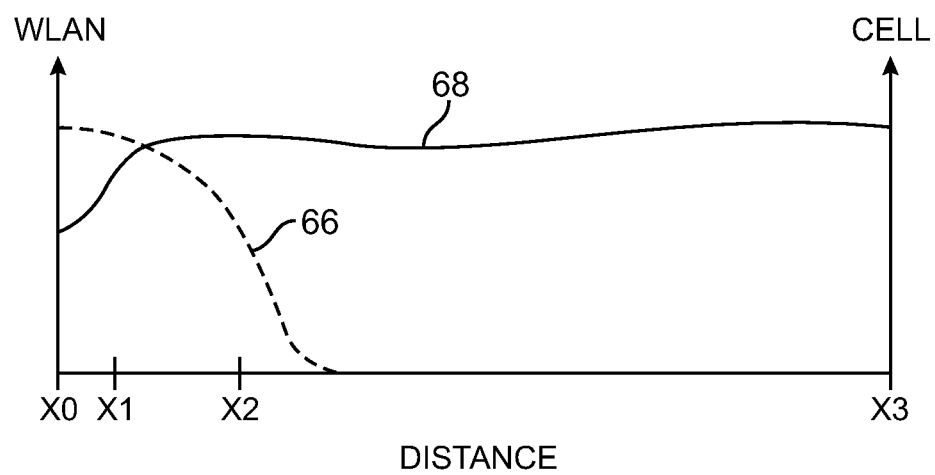
FIG. 5 is a graph showing how signal strength for a wireless local area network link may vary relative to signal strength for a cellular telephone link as a user device travels through various operating environments in accordance with an embodiment of the present invention.

FIG. 5 is a graph illustrating how device 14 may manage a handover between a wireless local area network (WLAN) voice over internet protocol (VoIP) call and a cellular telephone call (i.e., a non-VoIP call). In the graph of FIG. 5, dashed line 66 corresponds to WLAN signal strength and solid line 68 corresponds to cellular network signal strength. The location of user device 14 is plotted along the horizontal axis. A WLAN access point is located at position X0 and therefore exhibits declining signal strength at positions greater than X0. A cellular telephone base station is located at position X3 and therefore exhibits lowered signal strengths away from this location (e.g., at position X0).

Consider a scenario in which a user is located at position X0 (e.g., inside a building). In this position the WLAN signal strength may be high and the cellular network signal strength may be so weak that a cellular telephone call cannot be supported using the cellular network. Accordingly, when located in position X0, a voice call with a remote user may be conducted using VoIP over the WLAN link. Device 14 can monitor the signal strength of the WLAN and cellular network signals. As the device is moved to positions between X1 and X2, cellular signal strength rises to an acceptable level. Device 14, which is monitoring the signal strength, detects this change. Device 14 may therefore opt to continue with the VoIP call or may switch to using the available cellular network (e.g., automatically in response to previously adjusted settings or in response to gathering user input after displaying an on-screen prompt for the user). At positions between location X2 and X3, WLAN signal strength is too weak to support a WLAN link, so communications is switched seamlessly to the cellular network. The virtual communications link is maintained between the two users, because the voice call is not interrupted as the user moves from position X0 towards position X3.

Figure 6:
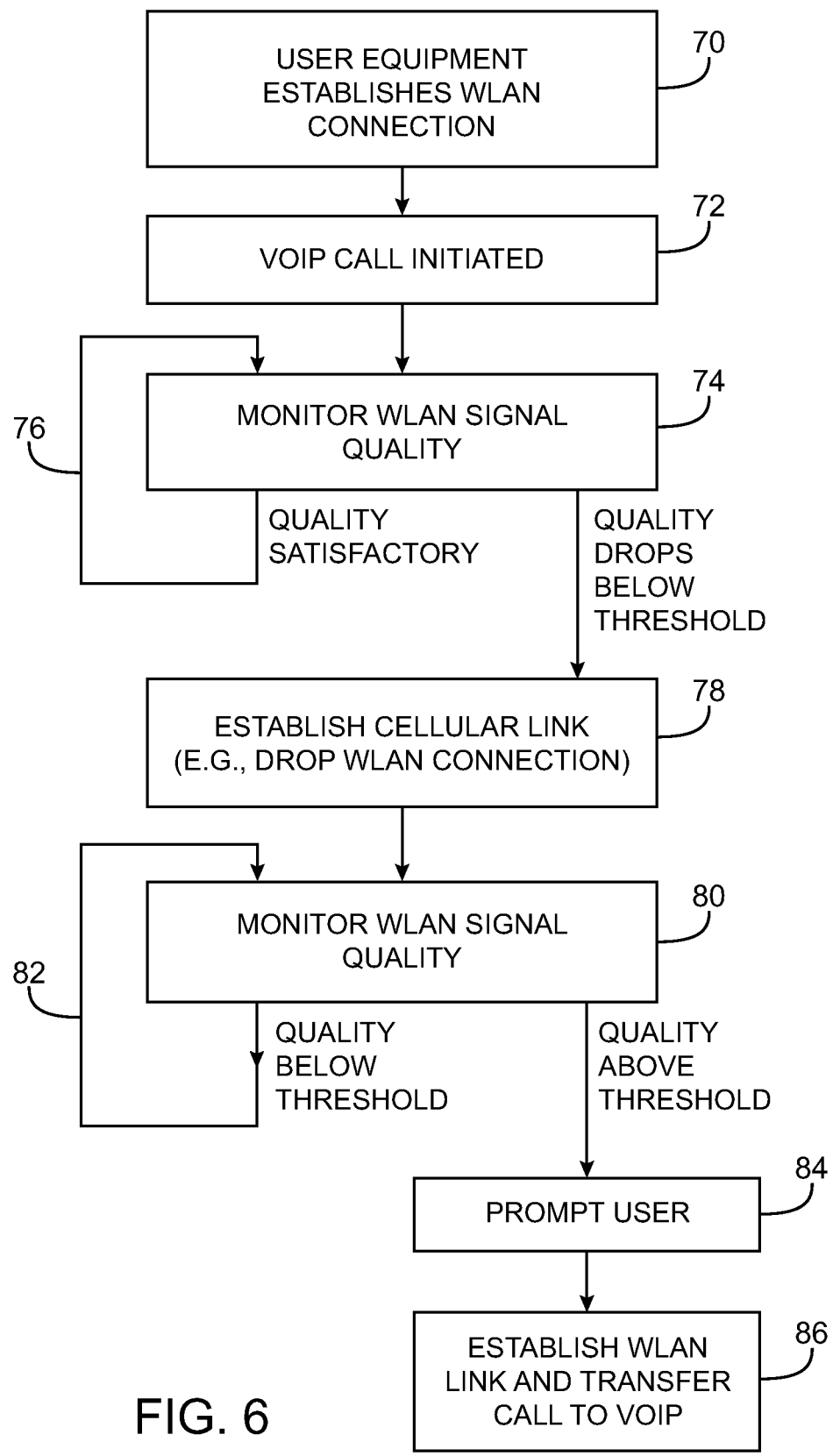
FIG. 6 is a flow chart of illustrative steps involved in operating an electronic device while communicating with other equipment over a voice-over-internet protocol link or other link in accordance with an embodiment of the present invention.

Illustrative steps involved in transitioning between physical communications links in this way are shown in the flow chart of FIG. 6. At step 70, device 14 (i.e., user equipment) may establish a communications link with the WLAN access point (i.e., when device 14 is located at position X0 of FIG. 5).

A VoIP call from the user of device 14 to another user may be initiated at step 72 (e.g., by launching a VoIP call on device 14).

At step 74, device 14 may monitor WLAN signal quality (e.g., using WLAN transceiver 46 of FIG. 2 or other wireless circuitry 40).

If signal quality is satisfactory (i.e., if the signal strength remains above a given threshold or if other signal quality metrics indicate that the signal strength is sufficient to maintain the WLAN link), processing may loop back to step 74, as indicated by line 76.

If, however, device 14 determines that signal quality has dropped below the given threshold, a cellular network link (i.e., a remote wireless link with cellular base station 18 of FIG. 1) may be established at step 78, If desired, device 14 may continue to monitor WLAN signal quality at step 80. If quality remains low, processing may continue to be monitored by looping back to step 80, as indicated by line 82. If quality has risen above the given threshold, the user may be provided with an optional prompt at step 84 that asks the user whether the user desires to return to the WLAN VoIP call or would prefer to remain in the cellular network call. Prompt 84 may be omitted (e.g., when previous user settings eliminate the need for the prompt or by default). If prompt 84 is not used, the WLAN link and VoIP session may automatically be reestablished at step 86. When transitioning between the VoIP call and cellular telephone call, device 14 may use information on the called user's VoIP address and the called user's cellular telephone number to ensure that proper connections can be made when needed.

In the example of FIG. 6, a telephone call was maintained between users by switching between a WLAN VoIP link and a cellular network link. Other types of communications link changes may be made if desired. For example, if audio service for a telephone call is not available or is otherwise not desired, device 14 can switch to a text messaging service. When audio service becomes available, device 14 can switch back to the audio telephone call.

Figure 7:
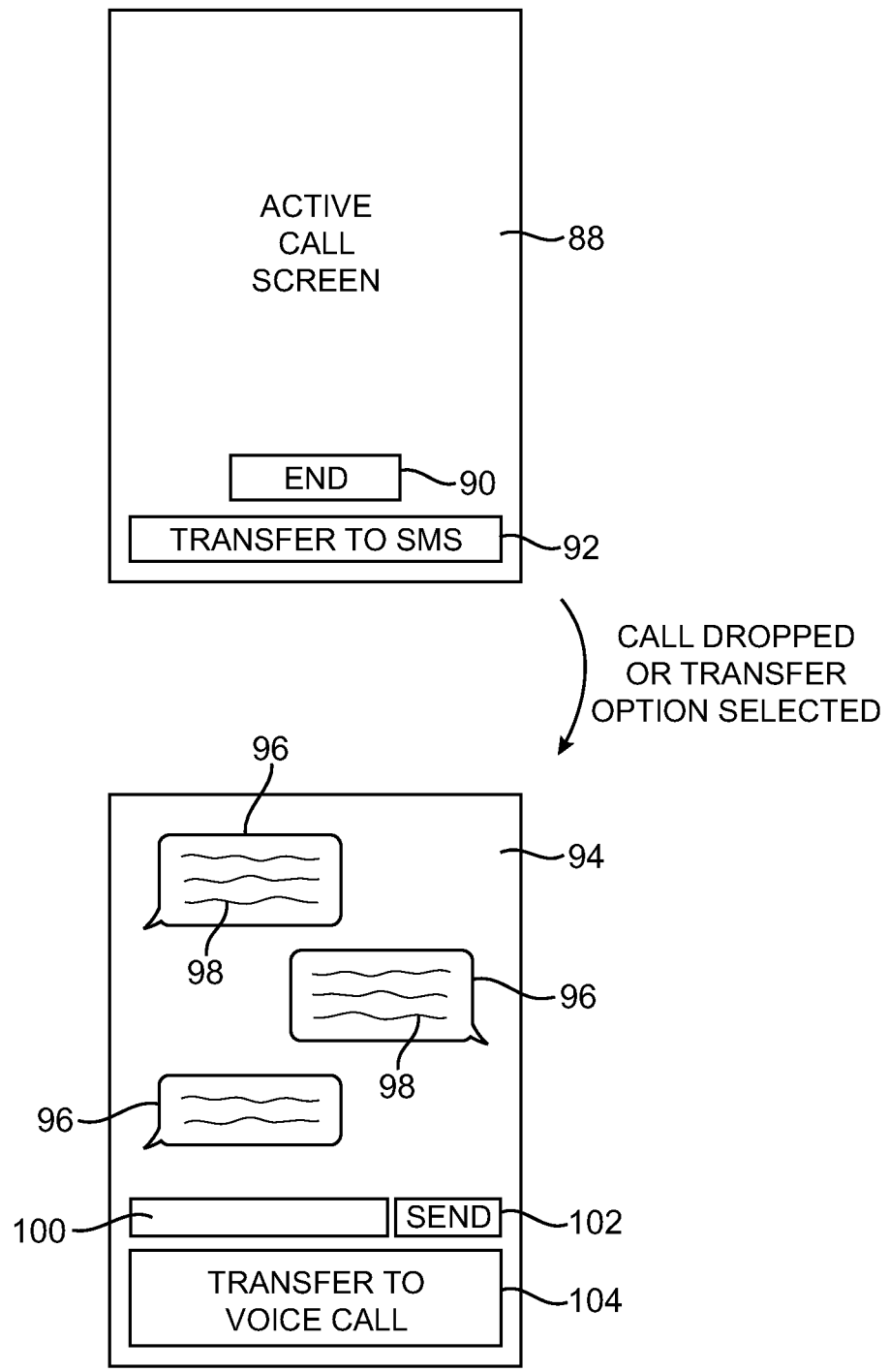
FIG. 7 shows illustrative display screens that may be presented to a user on an electronic device when a cellular telephone call is active and when a cellular telephone call has been replaced with a text messaging session in accordance with an embodiment of the present invention.

This type of approach is illustrated in FIG. 7. FIG. 7 shows illustrative screens that may be displayed on the display of device 14 when transitioning between a voice telephone call (e.g., VoIP, cellular, or a mixed VoIP and cellular call of the type described in connection with FIG. 6) and a text messaging session. Text messaging, which is sometimes referred to as Short Message Service (SMS) messaging, involves the transmission of relatively short text messages over the cellular network.

In the FIG. 7 example, a user is initially conducting a voice telephone call. As shown in the upper portion of FIG. 7, an active call screen such as screen 88 may be displayed on device 14. Screen 88 may include the name of the party at the other end of the call, a picture of the called party, a telephone number of the called party, etc.

End option 90 may be selected by a user to hang up and thereby end the telephone call. Transfer to text messaging option 92 may be selected by the user (e.g., by pressing on the touch screen of device 14) if it is desired to manually transition from the voice call to a text messaging session with the called party. Device 14 may also monitor the voice call link quality and may, if inadequate quality is detected, automatically transition from the voice call to the text messaging session.

As shown in the lower half of FIG. 7, when a voice call is automatically dropped or is manually terminated in favor of the text messaging session, a screen such as screen 94 may be displayed for the user. Screen 94 may contain text messing boxes such as boxes 96 that contain text messaging text 98. Boxes 96 may be justified to the left or right side of screen 94 to indicate which text belongs to the calling party and which text belongs to the called party (as an example).

When transitioning between a voice call and text messaging session, it is possible for users to lose track of the thread of the conversation. To help prevent this source of confusion, device 14 may store information on the content of the voice call in a buffer in system 10 or in storage and processing circuitry 24 during the voice call (e.g., by storing this information in a first-in-first-out buffer on a continuous basis). When the transition is made to the text messaging session, the stored information from the buffer may be used to populate an initial set of boxes 96 (i.e., to create text 98). Voice information may be stored in the buffer in the form of digitized voice information. When the text session is initiated, the voice information may be converted into text using a voice recognition algorithm running on storage and processing circuitry 24. If desired, the voice recognition algorithm may run continuously and the resulting text of the voice call may be maintained in the buffer.

Text entry box 100 may be used to enter text during text messaging. A user may click on option 102 to sent text that has been entered in text entry box 100 to the other caller. A selectable option such as transfer to voice call option 104 may be selected by a user if the user desires to return to the original voice call from the text messaging session when link quality permits. Device 14 may also be instructed by default or user settings to automatically return to the voice call when link quality permits.

Figure 8:
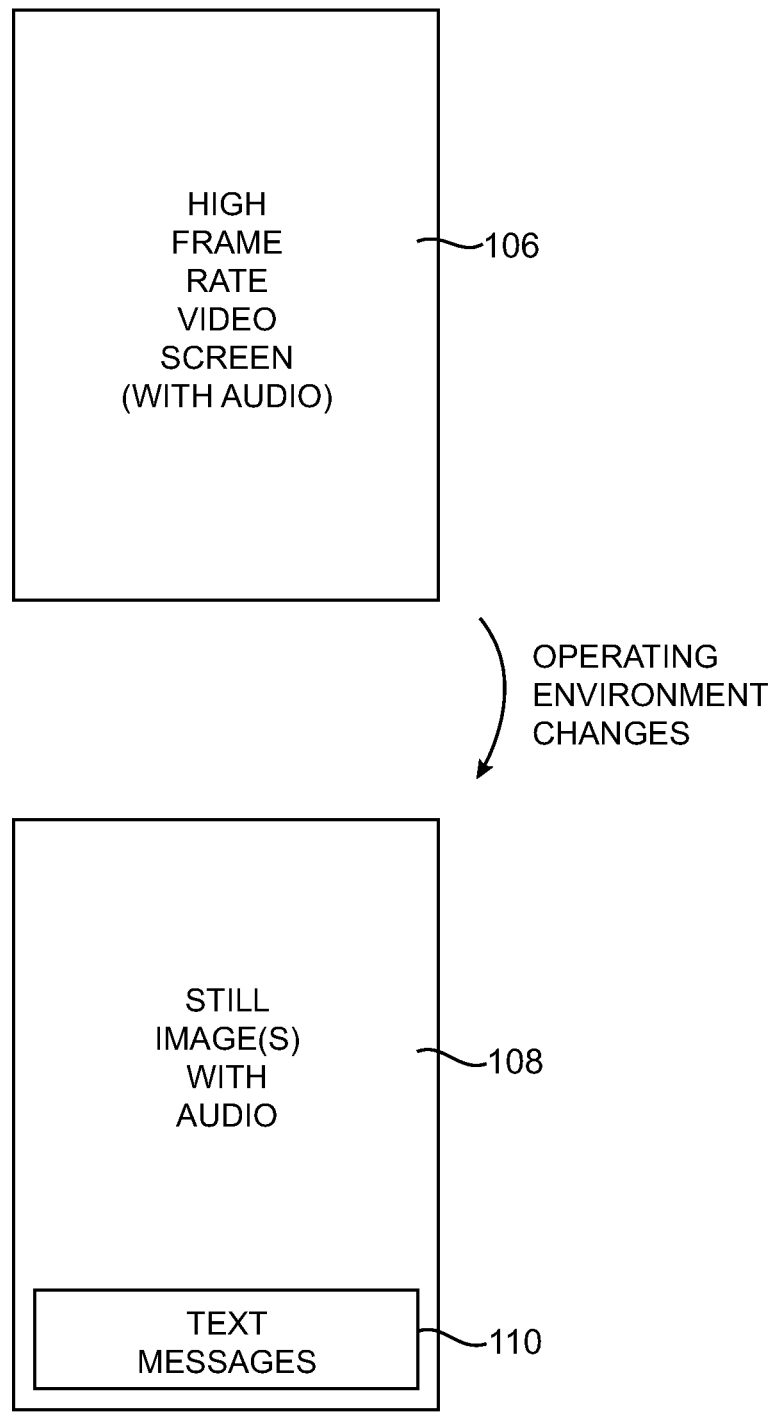
FIG. 8 shows illustrative display screens that may be presented to a user on an electronic device before and after degradation in available link quality has resulted in a change in the type of service that is being implemented on the electronic device.

If a link becomes degraded during operation, it may be desirable to adjust the level of communications service that is being supported to accommodate the new link conditions. Consider, as an example, the scenario of FIG. 8. As shown in FIG. 8, device 14 may be supporting a video call between users. Each user may be provided with a relatively high-frame-rate video of the other user such as a video captured at a frame rate of about 10-30 frames per second. The video may be accompanied by audio. During the video call at the high frame rate, a user may be provided with a screen such as screen 106 in the upper portion of FIG. 8.

If the operating environment of the user's device changes (e.g., due to movement of the device, due to signal interference, or other factors), it may no longer become possible to satisfactorily transmit all of the video for the call. Device 14 can monitor the operating environment of the device and, upon detecting a decrease in the ability of the communications link and device 14 to support the initial high-frame-rate video traffic, can switch to a different type of traffic in which information is conveyed and displayed in a still-image-only format or other reduced-bandwidth format, such as the format used in screen 108 in the lower portion of FIG. 8. Switching the type of traffic that is being conveyed over the link in this way allows the virtual communications link between the users to be maintained. If desired, image transmission may be halted entirely while maintaining an audio link. A user may opt to transition to a text message session by clicking on on-screen option 110, as described in connection with FIG. 7. On-screen options may also be provided that allow a user to adjust the size of the displayed video, the desired frame rate and camera resolution, etc. Adjustments such as these or other service level adjustments can be made automatically to accommodate operating environment changes.

Figure 9:
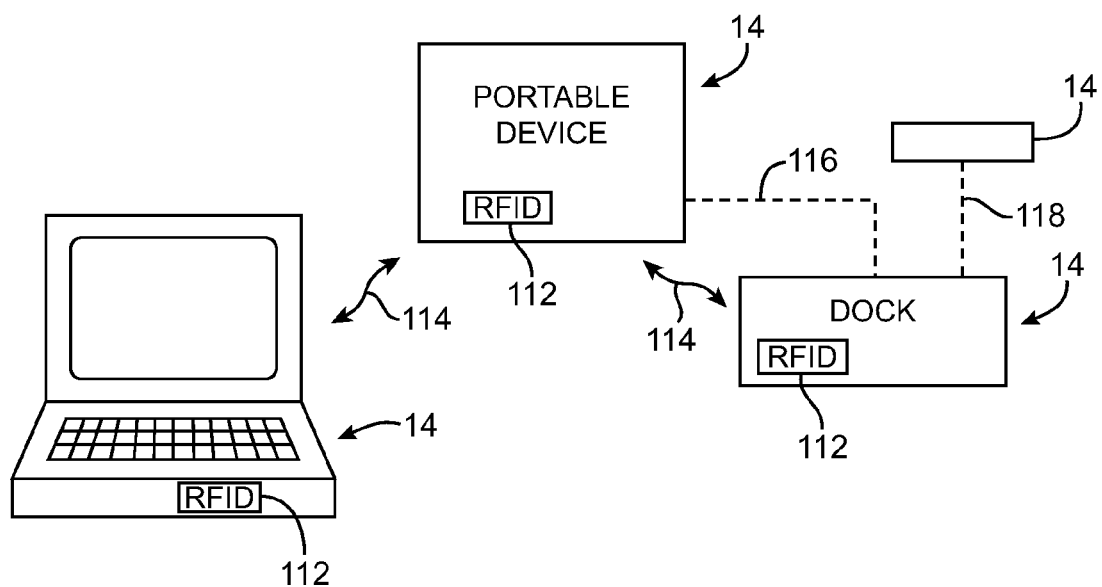
FIG. 9 is a diagram of a system in which an electronic device has automatically discovered the presence of nearby devices in accordance with an embodiment of the present invention.

FIG. 9 shows how devices 14 can automatically discover other devices 14 using wireless communications links such as radio-frequency identification (RFID) links. As shown in FIG. 9, devices 14 may be provided with RFID units 112. Units 112 may include antennas and RFID transceiver circuitry that locally broadcasts identifying information to corresponding antennas and RFID transceiver circuitry in nearby devices 14. When a device with an RFID unit is brought into the vicinity of another device with an RFID unit, the devices may automatically exchange information such as authentication information and information for establishing data communications links.

Consider, as an example, a situation in which a user carries a portable electronic device into a room in a building. The room may already contain a laptop and a dock or other base station. Other equipment that may be present in the room includes televisions, computer monitors, and other electronic equipment.

As the user enters the room, the RFID circuitry in the user's device and the RFID circuitry in the devices that are already present in the room can automatically communicate with each other. If desired, the user's device can use broadcast information from the RFID units of other devices to authenticate those devices. Devices can be authenticated using authentication codes, by preregistering equipment with a central service (e.g., using server 8 of FIG. 1), or by requiring a user to enter information into a device (e.g., username and password information, biometric information, etc.). As a user's device comes into wireless contact with RFID units of other devices, the user's device can authenticate each device before allowing a local or remote wireless link to be formed. For example, a user's device can use RFID authentication to determine whether a computer monitor, laptop, or television should be wirelessly linked to the user's device.

With automatic RFID authentication techniques, authenticated devices may be automatically linked to the user's device. With manual or semi-automatic techniques, additional authentication information (e.g., username and password information, etc.) may be entered into one or more of the devices before the devices are authenticated. Scenarios in which certain types of links are formed automatically without verifying the authorization of the equipment to form a wireless link may also be used. For example, a printer may automatically be wirelessly linked to a user's device without authentication, because the user's decision to print items using the printer provides an additional layer of security.

As a user carries equipment 14 with RFID circuitry 112 into range of authorized equipment 14 with RFID circuitry, equipment 14 may, for example, form wireless links such as wireless local area network links, remote links, combinations of these links, or other wireless links. Each device may automatically advertize its capabilities. For example, a television may broadcast information that informs nearby equipment that the television is capable of displaying video and audio, a computer monitor may advertize its ability to connect to the internet and to display a variety of media, a docking station may advertize its ability to form a wired connection with a device (shown as illustrative wired connection 116 in the example of FIG. 9), etc. A user may click on on-screen options or may otherwise direct equipment 14 to form desired connections.

Consider, as an example, a user who has carried a portable electronic device into the vicinity of a docking station. After the docking station and the portable device authenticate to each other using RFID units 112, the user may be provided with an opportunity to connect to equipment 14 that is connected to dock 14 using links such as link 18. This equipment may include, for example, mice or other pointing devices, keyboard, monitors, speakers, etc. Link 18 may be a wired or wireless link (e.g., a universal serial bus link). Once connected, the user may enter data into the user's portable device using user input devices such as keyboards that are associated with the dock or other base station.

As another example, consider a user who has entered a room that contains a computer monitor, television, dock, or other equipment. The user may be carrying on a telephone conversation with a remote user. The telephone conversation may include audio, video, still images, associated graphics (e.g., a shared desktop session or other computer meeting session), etc. Following automatic RFID procedures, the user's device may automatically (or in response to user input) link to one or more pieces of the equipment in the room. The user's device may, for example, connect to a base station or a computer. When a connection is formed with new equipment in this way, the ability for the telephone call to handle different types of media may increase or may decrease. For example, a dock to which the user's device links may only have the ability to handle audio through an attached handset. As another example, a computer to which the user's device is connected may have advanced video conferencing and internet meeting capabilities or other file sharing capabilities.

As the user adds and drops links with associated equipment, the form in which the telephone call is handled may change accordingly. For example, if a new piece of equipment makes video conferencing available (or allows a higher level of video conferencing to be available such as a high-definition stream), the user's equipment can automatically leverage the increased capabilities of the new equipment to enhance the type of call that is being made. The user may, for example, be presented with an on-screen option on the user's device or the ancillary equipment that asks the user whether to "switch to video conferencing?". If the user responds affirmatively, the virtual communications link that has been formed between the user and the remote user can be maintained, while automatically enlisting the advanced capabilities of the linked equipment (e.g., to capture, process, and display images for the video conference).

Figure 10:
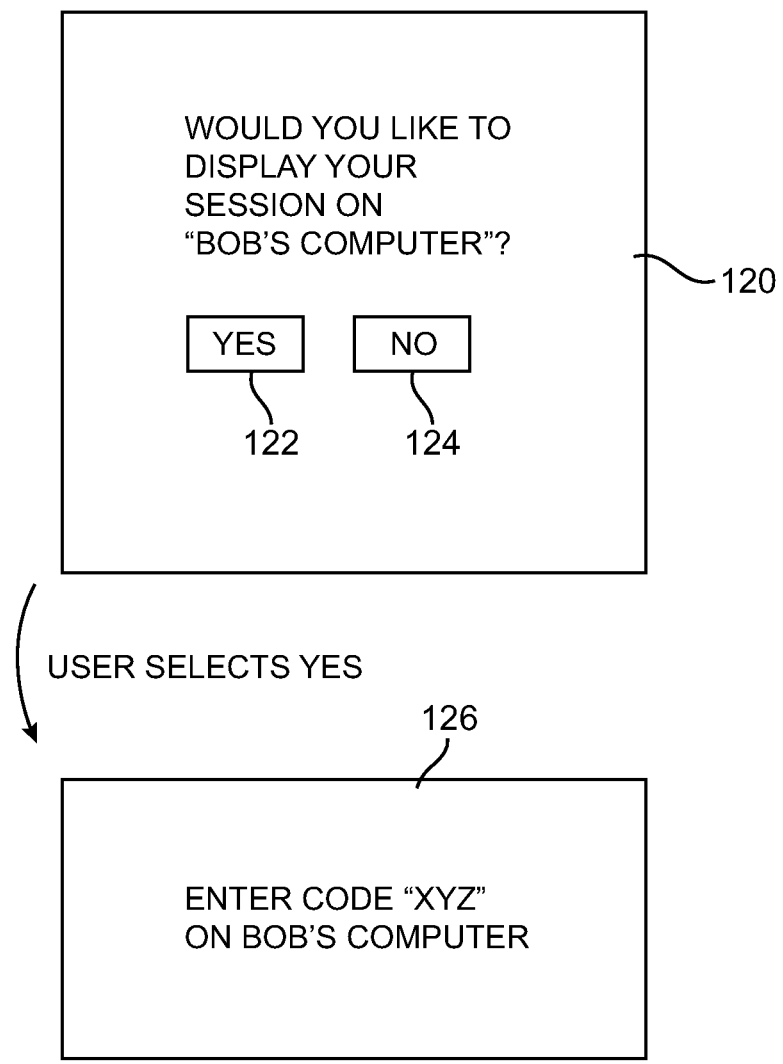
FIG. 10 shows illustrative display screens that may be displayed on a user's electronic device when a user's electronic device comes within range of ancillary equipment capable of displaying content from the user's electronic device in accordance with an embodiment of the present invention.

An illustrative screen that may be displayed to a user when the user's equipment links to new equipment is shown in FIG. 10. In the scenario of FIG. 10, the user is conducting a voice telephone call using the user's electronic device 14. As the user enters the RFID and local wireless range of a laptop computer, RFID authentication and automatic or manual linking techniques may be used to wirelessly link the user's device to an ancillary piece of equipment such as a portable computer. The portable computer (in this example) has an integrated camera and display and is therefore capable of handling a video call with the remote user.

To ensure that the call is not transferred and displayed on a nearby computer without the permission of the user, a screen such as screen 120 may be displayed on the user's device. Screen 120 may contain a prompt that asks the user whether or not the user would like to handle the current telephone call on the new equipment (called "Bob's computer" in this example). If the user prefers to continue communicating using the audio capabilities of the user's equipment, the user can select "no" option 124. If the user would prefer to switch the session to Bob's computer, the user may select option 122. Options such as options 122 and 124 may be displayed on a touch screen or other user interface techniques may be used to gather user input (e.g., voice recognition, buttons, etc.). Once option 122 has been selected, the user's device may present a screen such as screen 126. Screen 126 may contain instructions that direct the user to enter a code using the new equipment (i.e., using the keys on Bob's computer). Screen 126 may also display the code (e.g., "XYZ").

Figure 11:
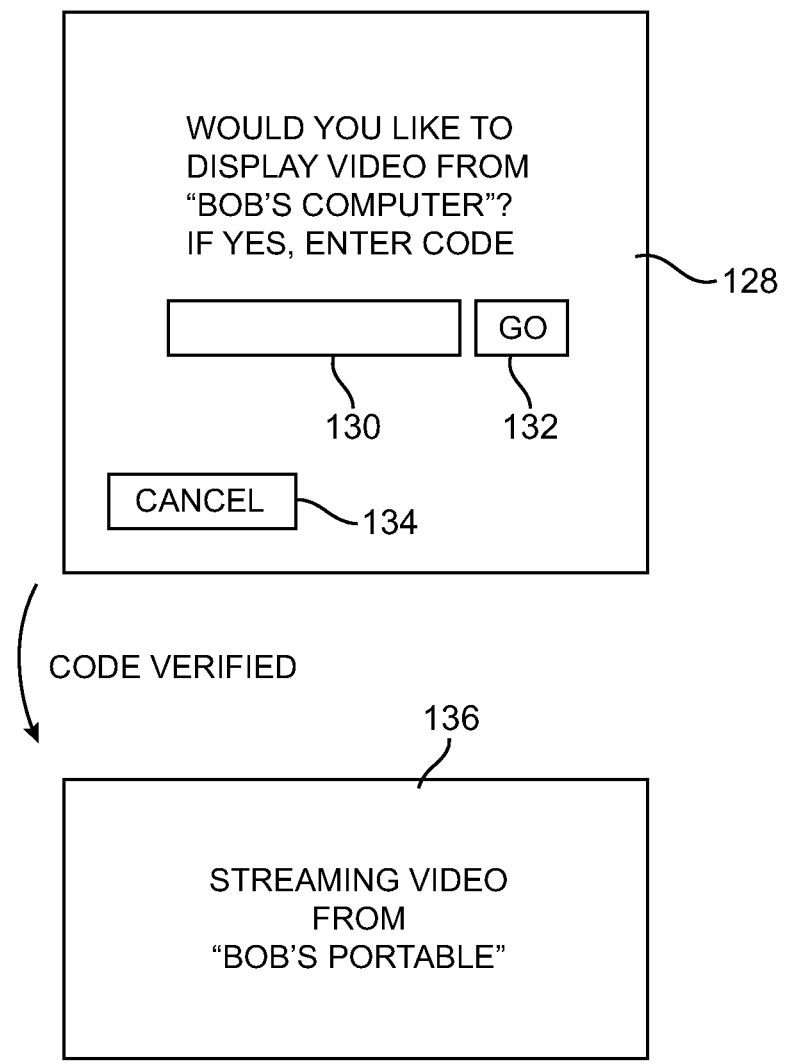
FIG. 11 shows illustrative display screens that may be displayed on ancillary equipment before the ancillary equipment allows content from a user's in-range electronic device to be displayed in accordance with an embodiment of the present invention.

On Bob's computer, a screen such as screen 128 of FIG. 11 may be displayed that instructs the user to enter the code (i.e., "XYZ") into a text box or other code entry region 130. If the user desires to cancel the session transfer process, the user may select cancel option 134. If the user desires to complete the transfer process, the user may enter the appropriate code into region 130 and may select go option 132. Once the code has been entered, the user's equipment and the newly added equipment (i.e., Bob's computer") may cooperate to transfer the existing communications session to Bob's computer. During this transfer, the enhanced capabilities that are available on Bob's computer (e.g., video conferencing capabilities or enhanced video conferencing quality) may be automatically switched into use, while retaining the virtual link between the user and the remote user.

In this example, the features that were selectively added to the virtual communications link between the local and remote users involved video conferencing capabilities and were based on the addition of a local link to new equipment (e.g., a link authenticated automatically by RFID units, etc.). This is, however, merely illustrative. Any suitable features may be added or subtracted from a communications session while maintaining a virtual communications link between a pair of parties. As an example, bandwidth may be increased or decreased, VoIP and file sharing capabilities may be increased or decreased, latency may be increased or decreased, communications protocols may be changed, physical communications channels may be added, removed, or changed, displays, speakers, input-output devices, and other hardware may be added and removed, security settings such as encryption settings may be strengthened or weakened, the mode of communications may be changed (e.g., between a first mixture of audio, video, and text and a distinct second mixture of audio, video, and text). Content buffering (audio, video, text, etc.) may be used to ensure continuity in the communications session despite these changes.

Interactive options (e.g., screens of the type shown in FIGS. 10 and 11) may be used to ensure that changes in the communications features that are being made are acceptable. Automatic changes to these features may also be made to avoid disturbing the user. Default settings or user-supplied settings in device 14 may be used to determine whether changes are implemented automatically or whether prompts are provided to one or both of the parties to a communications session.

In scenarios in which multiple parties (devices) to a communications session are affected by a change, it may be desirable to involve all affected parties (devices) in the decision to make the change. Consider, as an example, the process of switching to a new physical communications channel. In this type of situation, both users to a link may be provided with interactive options on their respective devices. The interactive options may inform each user of the availability of a new physical channel or other proposed change. The interactive options may provide each user with an opportunity to decline or to accept the proposed change. If each user accepts the proposal, the physical channel change can be implemented. If desired, one user may initiate the prompting process. In response, the device of the other user may ask the other user whether or not to proceed with a switch to a new service or other proposed change. For example, a first user who is a party to a communications session with a second user may click on an icon on the device of the first user that corresponds to a new service. Before launching and using the new service, the device of the first user may communicate with the device of the second user. In response, the device of the second user may display an on-screen option on the device of the second user that asks the second user whether or not the second user desires to use the new service. If the second user agrees, the service change may be implemented.

User equipment 14 may automatically monitor the environment to detect the presence of a user. A user may be automatically detected when the user's presence is advertized by an RFID unit (e.g., an RFID unit associated with a user device). A user may also be automatically detected using sensors. Once a user has been detected, user equipment 14 can automatically make changes to communications services. For example, communications features may be made available based on the user's identity.

Figure 12:
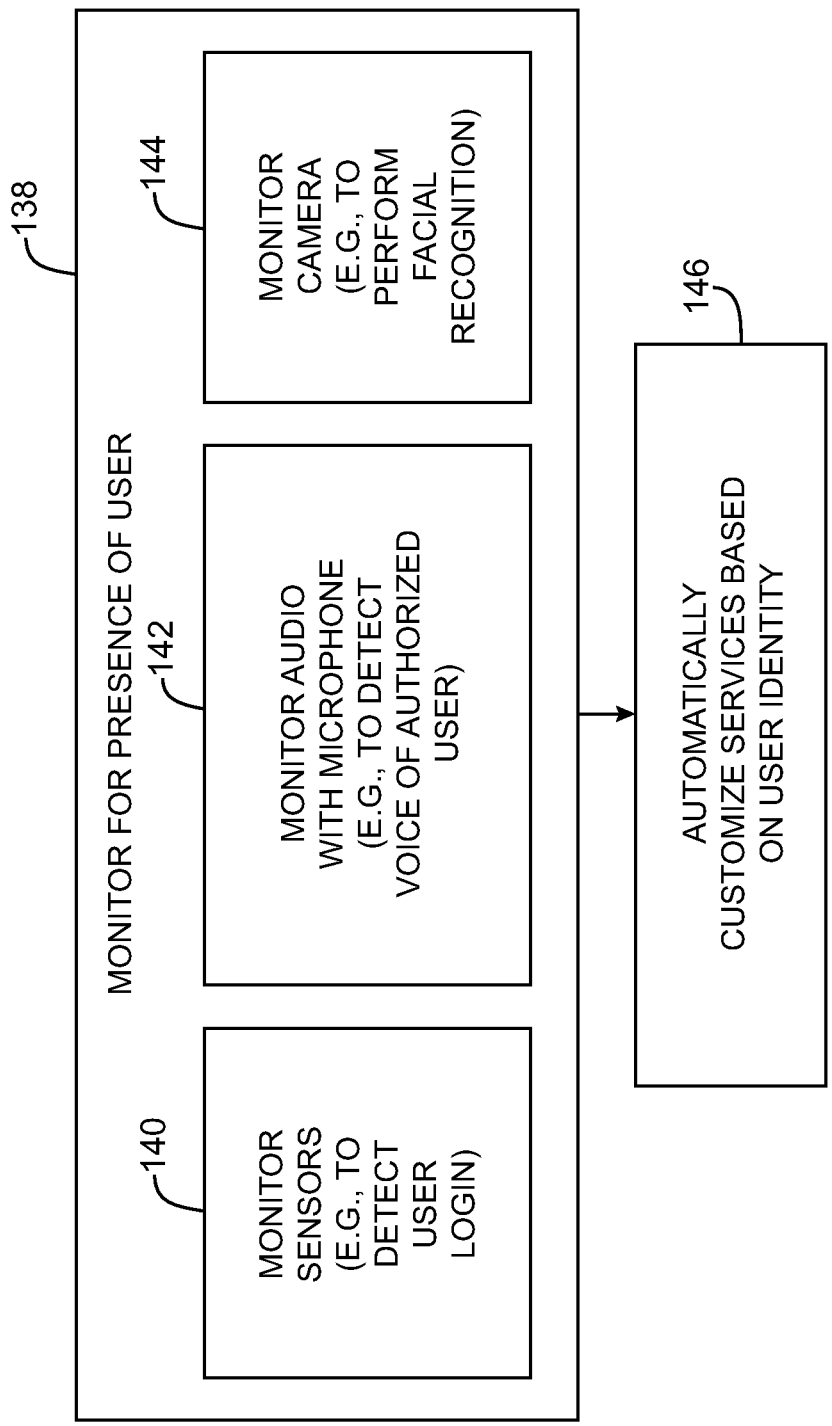
FIG. 12 is a flow chart of illustrative steps that may be used in automatically customizing the services that are available to a user operating an electronic device in accordance with an embodiment of the present invention.

A flow chart of illustrative steps involved in using electronic device 14 to perform monitoring operations such as these is shown in FIG. 12. At step 138, equipment 14 may use sensors (input-output circuitry) to monitor the environment of device 14. Equipment 14 may, for example, use sensors to detect when a user has logged into equipment (step 140). A user may, for example, enter a username and password into equipment 14 using a keyboard or touch screen or may make a fingerprint swipe that is recognized using a fingerprint reader. Audio may be monitored using a microphone (step 142). For example, a user may supply a voice sample, voice command, voice password, or other information that is monitored and authenticated using a microphone in equipment 14. During the operations of step 144, a video camera may be used to authenticate a user (e.g., by identifying a user's facial features or other visual attributes by comparison of captured still or video images to information in a database). Techniques such as motion detection, sound detection, and user input device actuation event detection may be used during the operations of step 138.

Once the presence of a user has been detected and any desired authentication operations have been performed, the user's equipment may be used in customizing services for the user. The services that are customized may be associated with telephone calls or other communications sessions between the user and remote parties or may be services that are associated with links between the user's equipment and remote equipment (e.g., host 8). A video download service may, for example, be automatically customized based on the identity of the user.

Consider, as an example, a family of users that is sharing a user device such as one of user devices 14 of FIG. 1. Each user may establish a registered profile with the device. Information in the profile may be stored locally (e.g., in storage in device 14) and remotely (e.g., in storage on server 8). Profile information may include media preferences and authorization levels (e.g., favorite genres), username and password information, etc. The profile information may, for example, include bookmarks such as bookmarks that point to favorite web pages or that point to one or more content locations. As an example, a bookmark or other information may identify a user's current position in a book that is being read by the user, may identify the user's location in media such as an audio book, video, or song, etc. Some users may be authorized for different levels of service. For example, one user may have access to the internet or games through the device and another user may not have internet or game access. Users may also be provided with selective access to content of different genres (e.g., by rating, genre type, media type, etc.).

At step 146, after a user's identity has been ascertained from the monitoring and identification operations of step 138, an identified user may be provided with customized services. If, for example, the user has access to all media types, internet access, and phone service, the user may be provided with opportunities to browse, purchase, and download media content, browse the internet, or make phone calls. If, however, a given user only has access to music playback services, the user device may restrict content access to that particular type of content. Any suitable types of service and levels of service may be customized. These are merely illustrative examples. Customizing the services that are provided in this way may help allow device 14 to be shared by multiple users.

Services may also be customized based on location information (e.g., satellite positioning information such as Global Positioning System data). As a user carries a portable electronic device to different locations, circuitry such as GPS receiver 42 of FIG. 2 may be used to determine the user's location. This information may be used in adjusting which equipment is in communication with the user's portable electronic device, the type of communications link that is being used (e.g., audio, video, text, etc.), link settings (e.g., bandwidth), etc. For example, a user may only be allowed to access certain content when the user is located at a particular location.

Figure 13:
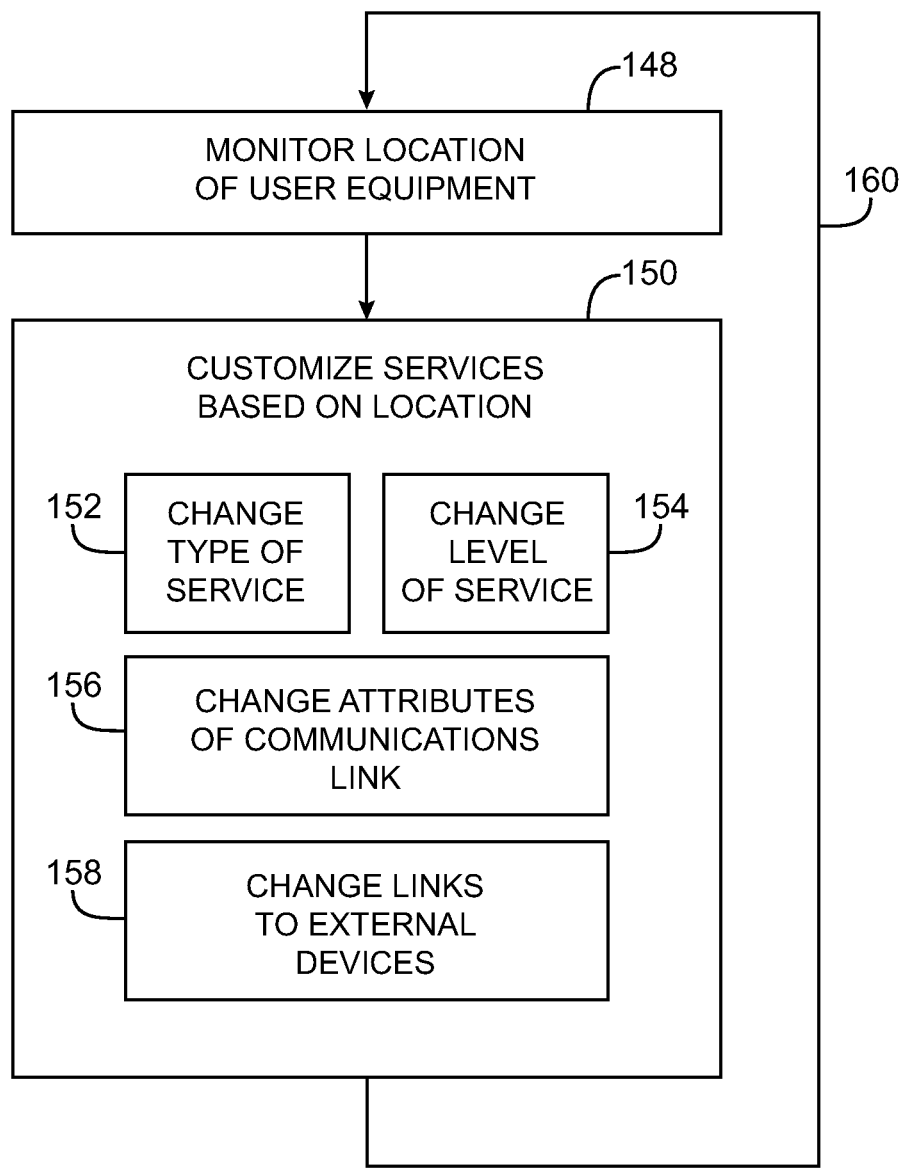
FIG. 13 is a flow chart of illustrative steps involved in customizing the operation of an electronic device in response to detected changes in the location of the electronic device.

Illustrative steps involved in using location information in customizing services on device 14 are shown in FIG. 13.

At step 148, device 14 may use wireless circuitry such as GPS receiver 42 or other circuitry to determine the location of device 14.

At step 150, device 14 may customize services on device 14 based on the measured location of the device. As illustrated by step 152, for example, device 14 may change the type of service that is provided to a user based on the user's location. If, for example, the user is in a particular location, video calls may be supported, whereas only audio calls or text messaging sessions may be supported if the user is in another location. As shown by step 154, device 14 may adjust the level of service that is provided to a user based on the user's location. For example, the amount of encryption or other security-related feature may be adjusted as a function of location, the ability to download particular types of content may be adjusted as a function of location, the ability to purchase products may be adjusted as a function of location, etc. During the operations of step 156, the attributes associated with a communications link such as the bandwidth of the link may be adjusted. The operations of step 158 may be used to change which physical links (e.g., which local links and which remote links) may be formed with external equipment as a function of location. Other changes may also be made if desired. As indicated by line 160, the user's location may be monitored continually and the operations of step 150 may be repeated using the user's updated position data.

Users may transfer information from user equipment 14 to other user equipment 14 over communications network 12. To facilitate information transfer operations, a user may, for example, register various pieces of equipment 14 with an online service (e.g., a service implemented using host 8 of FIG. 1). The online service may maintain a list of registered users. Periodically, each registered device 14 may report its current network address (e.g., its internet protocol address) to the online service. The online service may update the list of registered users accordingly (e.g., by updating the network address for each piece of registered equipment 14). If a user desires to transfer data to another piece of registered equipment (e.g., one of the user's other devices 14), the user may contact the online service.

Figure 14:
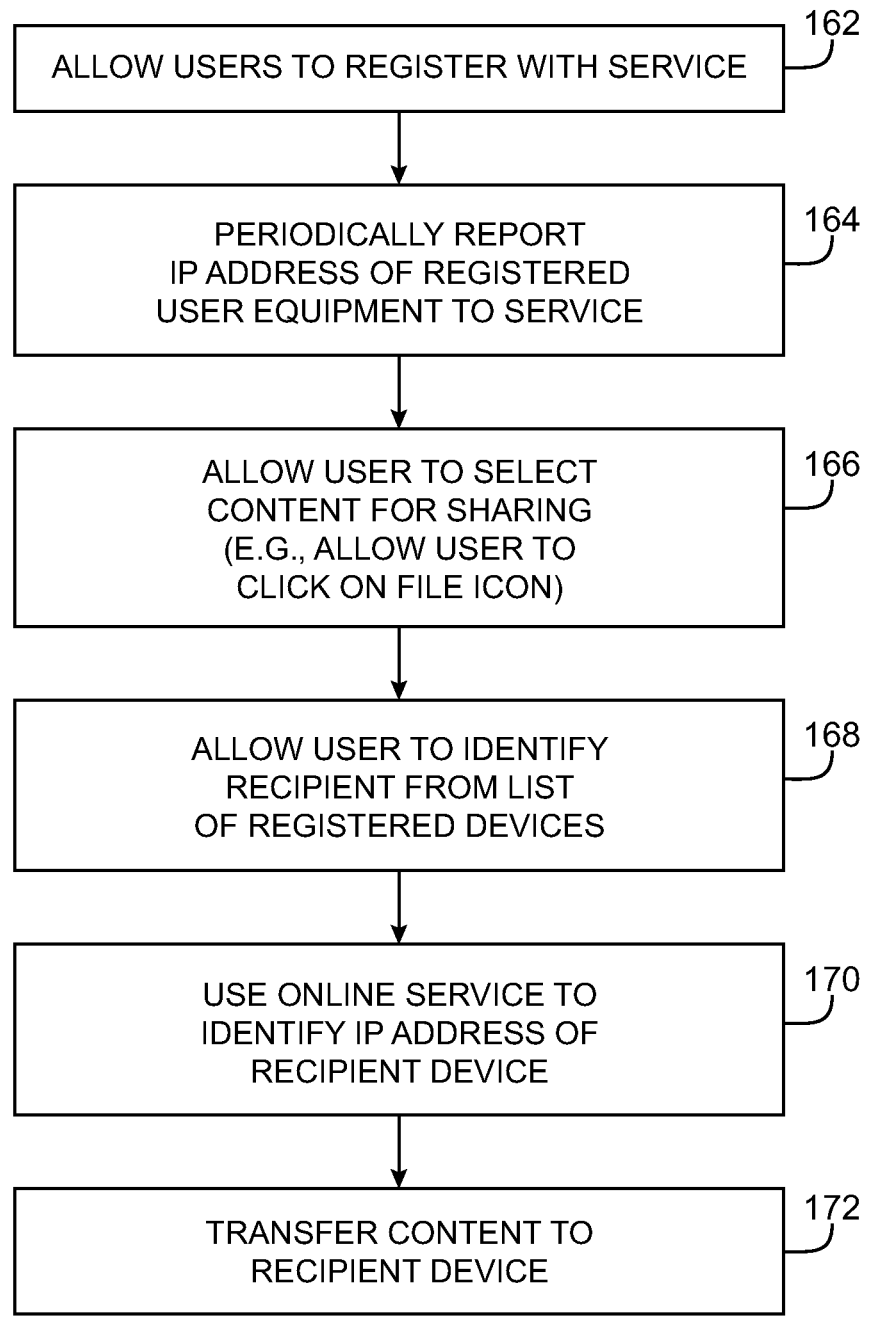
FIG. 14 is a flow chart of illustrative steps involved in registering users with an online service and allowing the network addresses of the registered users to be used in sharing content between user equipment in accordance with an embodiment of the present invention.

Illustrative steps involved in using this type of device registration and data transfer arrangement to share information between devices are shown in FIG. 14. At step 162, users may be provided with an opportunity to register devices with an online service. For example, host 8 may provide users with a web page or other interface through which the user can supply username and password information. Information identifying the device that is being registered may be provided in the form of a hardware address or other identifier.

Once registered, code on the device (e.g., code that is part of an operating system, application, or other software) may periodically report the current internet protocol address or other network address of the device to the online service over communications network 12 (step 164).

At step 166, a user of an electronic device may identify content that is to be shared and therefore copied to another device. The user may, for example, have a portable electronic device such as a portable computing device and may wish to share information on the device with a desktop computer. The user may click on a file in the portable electronic device by highlighting a file icon using a touch screen, by clicking on an on-screen icon or filename using a track pad or mouse, etc.

After the user has selected the desired file or other content item that is to be transferred, the electronic device may present the user with an opportunity to identify the device to which the item is to be transferred (step 168). For example, the device may present the user with a list of devices that are all registered to the user's account. From this list, the user may select the name of the user's desktop computer (as an example).

At step 170, the online service on host 8 may use the name of the target device or other suitable information to identify the current internet protocol address of the target device.

After identifying the current internet protocol address of the target device to which the item is to be transferred, the user's device may transfer the item (e.g., by copying the item or moving the item) to the target device over network 12 using the internet protocol address (step 172).

Figure 15:
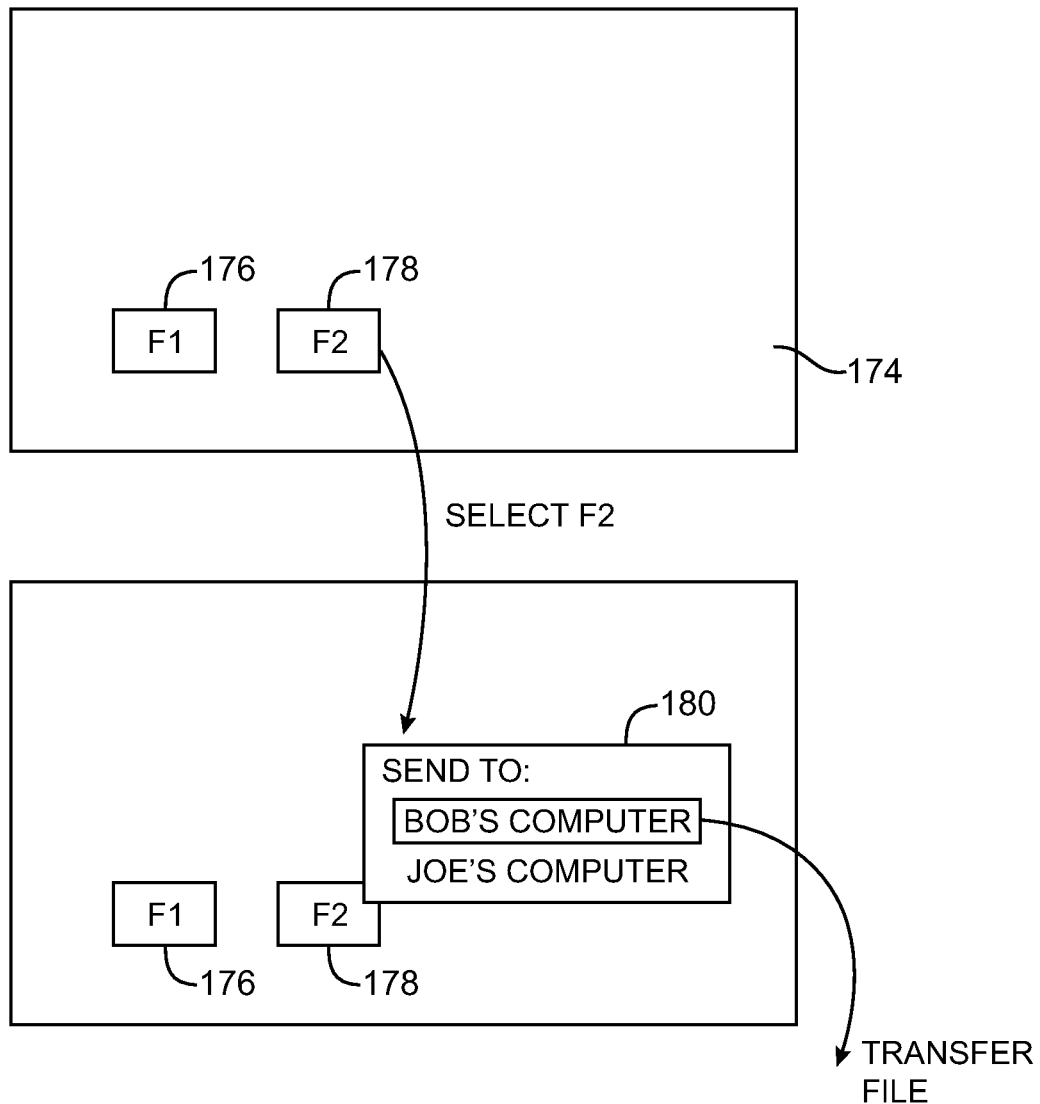
FIG. 15 shows illustrative display screens that may be used in sending content between electronic devices in accordance with an embodiment of the present invention.

Illustrative screens that device 14 may present to a user during this type of transfer operation are shown in FIG. 15. As shown in the upper portion of FIG. 15, a user of an electronic device who has navigated to a folder of interest may be presented with a screen such as screen 174 that contains on-screen icons for content items (e.g., icon 176 for a first file F1 and icon 178 for a second file F2). The user may select one of these items to transfer.

For example, a user may click on icon 178, as shown in the example of FIG. 15. When a user clicks on an icon or otherwise identifies which content item is to be transferred, the user's device may present an on-screen option that allows the user to identify the desired destination of the content item. In the example of FIG. 15, the user's device has presented a pop-up dialog in window 180 that contains a list of devices 14 to which the user may desire to send the selected content item. The list of devices in window 180 may, for example, correspond to a list of devices associated with a registered user (e.g., the user who is associated with the sending device). The user may select a desired destination device to initiate the transfer process.

File transfers of the type described in connection with FIGS. 14 and 15 may be made to any of the user equipment to which a communications link is automatically added, as described in connection with FIG. 9. For example, if a user brings a device into the vicinity of other devices, each device may advertize its presence wirelessly (e.g., using an RFID transceiver or other radio-frequency transceiver circuitry). When a user chooses to transfer a content item, the user's device may present a list such as list 180 of FIG. 15 that is populated with the names of advertized devices. The list may also contain a list of the registered devices that are available over communications network 12.

Virtual communications links between parties may be maintained as a user transitions between using different networks and as the user transitions between using different devices. For example, a first user may place a telephone call to a second user. The call may be made using a first piece of equipment. As the call progresses, the user may add and drop additional pieces of equipment as they become available. The type of call that is being supported may change accordingly. For example, if a user initially has equipment without video capabilities, a call may start as an audio-only communications session. When video-capable equipment is added, the call can be expanded to include transmission of still or moving images. Data transmissions can be handled using the user's original equipment, the newly added equipment, or both the original equipment and the newly added equipment. The user may also change networks. For example, depending on changes in link conditions or the proximity of the user to various types of network connections, it may be desirable to change the type of data format that is being used (e.g., from internet protocol packets to code division multiple access data streams, to Global System for Mobile cellular telephone data, etc.), the bandwidth or other link attributes, the type of wireless network link that is being used (e.g., local area network links, remote links with cellular base stations), etc.

Figure 16:
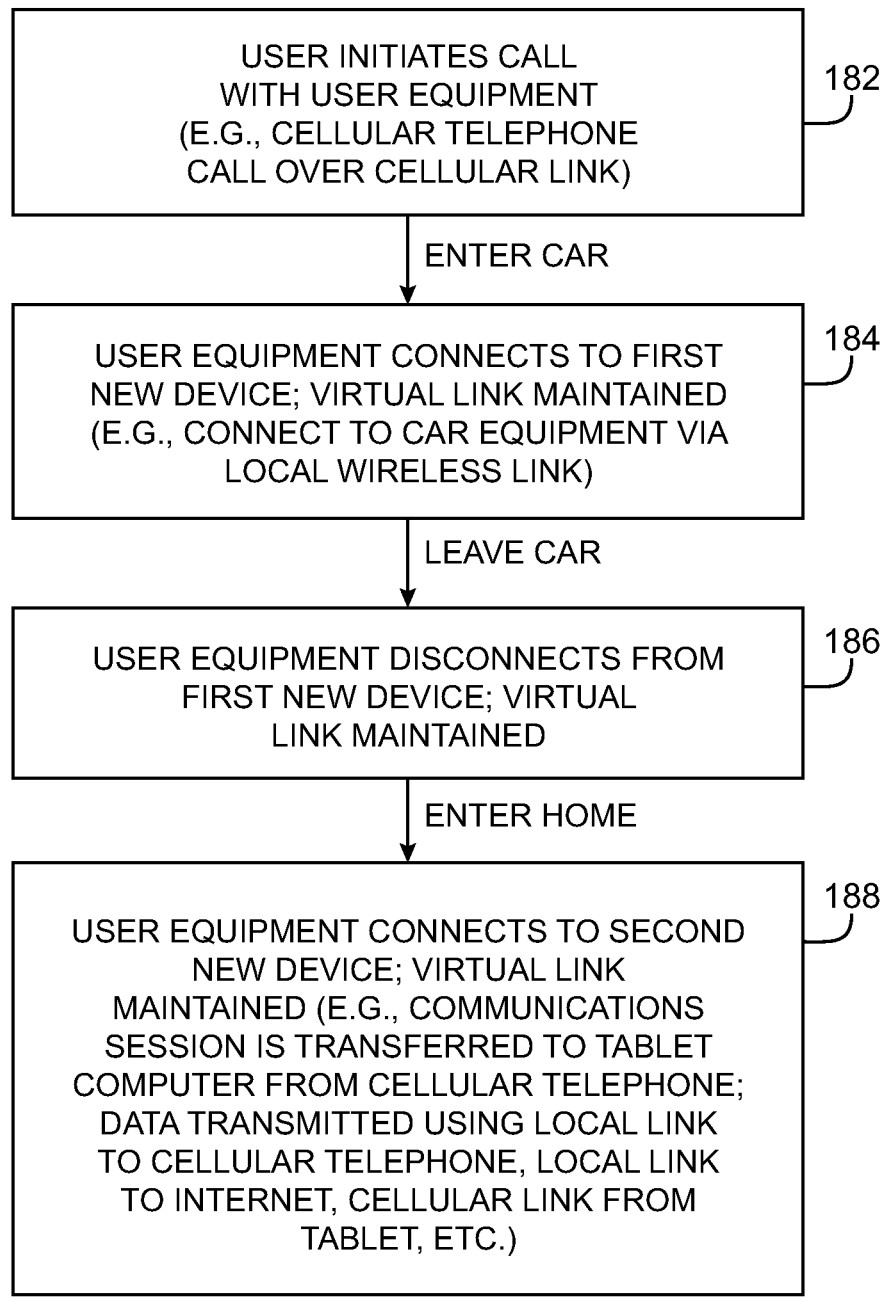
FIG. 16 is a flow chart of illustrative steps involved in maintaining a virtual communications link between parties as a user carries user equipment into and out of connection with various additional user devices in accordance with an embodiment of the present invention.

FIG. 16 shows illustrative steps involved in maintaining a virtual communications link between parties to a communications session as one of the users moves about and changes equipment and networks. This example involves a voice telephone call that transforms into a video telephone call as a user moves between three different environments: (1) a phone-only environment, (2) an environment in which the user in a car, and (3) and environment in which the user is in a home or office. In general, virtual communications links may be maintained continuously as a user transitions between numerous different environments each of which contains a potentially different collection of available equipment and each of which is capable of forming numerous potentially different sets of communications links. The example of FIG. 16 is merely illustrative.

As shown in FIG. 16, a user may initiate a communications session such as a telephone call with the remote equipment of a remote party using an electronic device such as a cellular telephone or other user equipment (step 182). During the operations of step 182, the user forms a virtual communications link with the remote party. The link may include, for example, a voice telephone link that is made between the user equipment and a cellular telephone base station.

The user equipment of the user may be portable (as with, e.g., a cellular telephone device). As the user is carrying out the telephone call with the remote party, the user may therefore move to new locations. The user may, for example, enter a car or other vehicle that has wireless communications capabilities. The car may have Bluetooth® circuitry or other circuitry for forming local wireless links. This allows the user to speak into a microphone on a steering wheel of the car while listening to audio through the car's speakers. The local wireless link conveys microphone and speaker data to the user equipment, which is linked to the remote party using the remote cellular telephone link. The virtual communications link between the user and the remote party is thus maintained.

If desired, the car may have its own remote communications capabilities. For example, the car may include a cellular telephone transceiver or other wireless circuitry that forms remote wireless links with remote base stations. In this type of situation, the communications session may be transferred from the user equipment to the equipment of the car. In the FIG. 16 example, however, the user's equipment forms a local wireless link with microphone and speaker circuitry in the car, while the user's equipment maintains a remote wireless link with a cellular telephone base station.

When the user exits the car, the local wireless link between the user's equipment and the car device is disconnected (step 186). The virtual communications link is maintained, so the user can continue to converse with the remote party using the hardware capabilities of the user's original user equipment.

At step 188, the user comes into communications range of an additional device. For example, the user may enter a home or office that contains a tablet computer or other device that has video display capabilities. The tablet computer and the user equipment may advertize their capabilities. When the user equipment detects the presence of the tablet computer, the communications session may be partly or fully transferred to the tablet computer while maintaining the virtual communications link with the remote party. When the session is transferred, the existing remote communications link between the user equipment and the cellular network may be maintained while a local wireless link (e.g., a Bluetooth® or WiFi® link) is formed with the tablet computer. The local link may be formed directly or through local area network equipment such as an access point. In this type of scenario, the tablet computer may be considered to be tethered to the user equipment. With another illustrative arrangement, the tablet computer takes over responsibility for the entire communications session from the user equipment. The virtual communications link with the remote party is maintained, because a new link is supported using the tablet computer in place of the user equipment. To support the session, the table computer may use cellular telephone network transceiver circuitry to form a direct link with remote cellular network base station or may form a communications link via a local wireless area network link to the internet (e.g., for internet-based communications such as VoIP communications).

Regardless of whether the tablet computer (or other new equipment) takes over full responsibilities for communications or tethers to the user equipment, new hardware may become available to the user. For example, if the tablet computer has a microphone, speakers, and a video camera, there may be a new or at least expanded ability available to the user to carry on a video call. When these new hardware capabilities become available, the nature of the communications session may change accordingly. For example, as the communications session transitions between relying exclusively on the user's original user equipment to relying at least partly on the tablet computer during the operations of step 188, the communications link may correspondingly transition from supporting an audio-only voice telephone call to a video telephone call that supports audio and video simultaneously.

Transitions between networks and devices of the type described in connection with FIG. 16 may be accompanied by on-screen prompts. For example, the user equipment and/or the newly added devices that the user encounters when moving the user equipment may provide confirmation screens that require user input before allowing transfers to proceed. Automatic transitions between devices and networks may also be supported if desired (e.g., in accordance with previously established default or user-supplied settings).

The foregoing is merely illustrative of the principles of this invention and various modifications can be made by those skilled in the art without departing from the scope and spirit of the invention. The foregoing embodiments may be implemented individually or in any combination.

What is claimed is:

1. A method for transitioning from a voice call to a text session between a first user and a second user, the method comprising:
    establishing the voice call between the first user and the second user over a first communications link;
    buffering a portion of the voice call;
    monitoring the first communications link;
    initiating the text session between the first user and second user over a second communications link in response to detecting a change in signal strength in the first communications link; and
    in response to initiating the text session:
        converting the buffered portion of the voice call into initial text data, wherein a first portion of the initial text data is associated with the first user and a second portion of the initial text data is associated with the second user, and
        displaying the initial text data at a user device associated with the first user, wherein the user device comprises a screen and the first portion of the initial text data associated with the first user and the second portion of the initial text data associated with the second user is displayed at different locations on the screen to indicate which portions of the initial text data are associated with each user.

2. The method defined in claim 1, further comprising:
    displaying a text entry option at the user device with the initial text data.

3. The method defined in claim 1, further comprising: automatically adjusting how much bandwidth is used in communicating over the first communications link.

4. The method defined in claim 1, wherein the change in signal strength in the first communications link comprises a signal strength in the first communications link dropping below a threshold.

5. The method defined in claim 4, further comprising re-establishing the audio call over the first communications link in response to detecting that the signal strength of the first communications link exceeds the threshold.

6. The method defined in claim 1, wherein the first communications link comprises a WLAN link and the second communications link comprises a cellular network link.

7. The method defined in claim 1, further comprising terminating the voice call prior to initiating the text session over the second communications link.

8. A method for communicating between a first electronic device and a second electronic device, the method comprising at the first electronic device:
    exchanging audio data with the second electronic device over a first communications link;
    buffering at least some of the exchanged audio data;
    monitoring the first communications link;
    in response to detecting a change in signal strength in the first communications link, initiating a text session to exchange text data with the second electronic device in place of exchanging the audio data; and
    in response to initiating the text session over a second communications link, converting at least some of the buffered audio data into text to produce initial text data, wherein a first portion of the initial text data is associated with audio data transmitted from the first electronic device and a second portion of the initial text data is associated with audio data transmitted from the second electronic device; and displaying the initial text data on a screen of the first electronic device, wherein the first portion of the initial text data associated with audio data transmitted from the first electronic device and the second portion of the initial text data associated with audio data transmitted from the second electronic device is displayed at different locations on the screen to indicate which portions of the initial text data are associated with each device.

9. The method defined in claim 8, wherein the first electronic device buffers at least some of the exchanged audio data by buffering at least some of the exchanged audio data in storage included in the first electronic device.

10. The method defined in claim 8, wherein the first electronic initiates the text session by automatically terminating a voice telephone call and automatically initiating an associated text messaging session between the first and second electronic devices.

11. The method defined in claim 8, wherein the change in signal strength in the first communications link comprises a degradation of signal strength in the first communications link.

12. The method of claim 8, further comprising monitoring the second communications link, and determining that the second communications link can support the text session.

13. An electronic device suitable for communications with a communication device, the electronic device comprising:
 a display screen;
 at least one interface configured to establish a connection to the communication device;
 a processor; and
 a storage device configured to store instructions that, when executed by the processor, cause the electronic device to:
  establish an audio call with the communication device over a first communications link,
  buffer a portion of the audio call,
  monitor the first communications link,
  in response to detecting a change in signal strength in the first communications link:
   initiate a text session with the communication device over a second communications link,
   convert the portion of the buffered audio call into initial text data, wherein a first portion of the initial text data is associated with audio transmitted from electronic device and a second portion of the initial text data is associated with audio transmitted from communication device, and
   automatically display the initial text data at the display screen, wherein the first portion of the initial text data and the second portion of the initial text data is displayed at different locations on the display screen to indicate which portions of the initial text data are associated with each device.

14. The electronic device of claim 13, wherein the change in signal strength in the first communications link comprises a degradation of signal strength in the first communications link.

15. The electronic device of claim 14, wherein the instructions, when executed by the processor, further cause the electronic device to re-establish the audio call with the communication device over the first communications link responsive to detecting a signal strength of the first communications link has improved.

16. The electronic device of claim 13, wherein the instructions, when executed by the processor, further cause the electronic device to terminate the audio call over the first communications link when the text session is initiated.

17. The electronic device defined in claim 13, wherein the instructions, when executed by the processor, further cause the electronic device to terminate the audio call prior in response to detecting the change in signal strength in the first communications link.

\* \* \* \* \*

UNITED STATES PATENT AND TRADEMARK OFFICE
CERTIFICATE OF CORRECTION

PATENT NO. : 8,797,999 B2  
APPLICATION NO. : 12/721528  
DATED : August 5, 2014  
INVENTOR(S) : Aleksandar Pance et al.

Page 1 of 1

It is certified that error appears in the above-identified patent and that said Letters Patent is hereby corrected as shown below:

In the Claims:

Column 22, line 11 (Claim 1, line 8): "and second" should read --and the second--.

Column 23, lines 13-14 (Claim 10, lines 1-2): "electronic initiates" should read --electronic device initiates--.

Column 24, line 1 (Claim 13, line 14): "strength in" should read --strength of--.

Column 24, line 5 (Claim 13, line 18): "the portion" should read --a portion--.

Column 24, line 18 (Claim 14, line 2): "strength in" should read --strength of--.

Signed and Sealed this  
Twenty-first Day of October, 2014

Michelle K. Lee  
*Deputy Director of the United States Patent and Trademark Office*